US012739922B2

(12) United States Patent
Kuge et al.

(10) Patent No.: US 12,739,922 B2
(45) Date of Patent: Sep. 15, 2026

(54) USER EQUIPMENT (UE) INCLUDING FIRST SINGLE NETWORK SLICE SELECTION ASSISTANCE INFORMATION (S-NSSAI), SECOND S-NSSAI, FIRST PROTOCOL DATA UNIT (PDU) SESSION OF SESSION AND SERVICE CONTINUITY (SSC) MODE 2, AND SECOND PDU SESSION

(71) Applicant: SHARP KABUSHIKI KAISHA, Sakai City (JP)

(72) Inventors: Yoko Kuge, Sakai City (JP); Yasuo Sugawara, Sakai City (JP); Shuichiro Chiba, Sakai City (JP); Masaki Izumi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 261 days.

(21) Appl. No.: 18/724,634

(22) PCT Filed: Jan. 23, 2023

(86) PCT No.: PCT/JP2023/001831
§ 371 (c)(1),
(2) Date: Jun. 27, 2024

(87) PCT Pub. No.: WO2023/188727
PCT Pub. Date: Oct. 5, 2023

(65) Prior Publication Data

US 2025/0119968 A1 Apr. 10, 2025

(30) Foreign Application Priority Data

Mar. 29, 2022 (JP) ................................ 2022-052713

(51) Int. Cl.
*H04W 76/19* (2018.01)
*H04W 48/08* (2009.01)
(Continued)

(52) U.S. Cl.
CPC ........... *H04W 76/19* (2018.02); *H04W 48/08* (2013.01); *H04W 76/30* (2018.02); *H04W 80/10* (2013.01)

(58) Field of Classification Search
CPC ..... H04W 76/19; H04W 48/08; H04W 76/30; H04W 80/10; H04W 48/18; H04W 76/11;
(Continued)

(56) References Cited

U.S. PATENT DOCUMENTS

2021/0100061 A1* 4/2021 Park ...................... H04W 76/25
2022/0248497 A1 8/2022 Tamura et al.
2026/0032530 A1* 1/2026 Choe ................ H04W 36/0064

FOREIGN PATENT DOCUMENTS

WO 2021/132096 A1 7/2021

OTHER PUBLICATIONS

3GPP TS 24.501 V17.5.0 (Dec. 2021) 3rd Generation Partnership Project; Technical Specification Group Core Network and Terminals; Non-Access-Stratum (NAS) protocol for 5G System (5GS); Stage 3; (Release 17).

(Continued)

*Primary Examiner* — Rafael Pérez-Gutiérrez
*Assistant Examiner* — Cristian O. Rivas
(74) *Attorney, Agent, or Firm* — ScienBiziP, P.C.

(57) ABSTRACT

In 5GS, provided is a communication unit for continuing services of a PDU session in a network slice in a case that the network slice is congested, a case that network performance of the network slice does not satisfy an SLA, or the like. In 5GS, provided are a method and a communication unit for a PDU session modification procedure, and/or a PDU session release procedure, and/or a PDU session establishment procedure, and/or a PDU session anchor change procedure, for implementing session and/or service continuity by changing a slice and changing PDU session anchor, (Continued)

in a case that a network slice is congested, a case that network performance of the network slice does not satisfy an SLA, or the like.

3 Claims, 10 Drawing Sheets

(51) Int. Cl.
*H04W 76/30* (2018.01)
*H04W 80/10* (2009.01)

(58) Field of Classification Search
CPC ..... H04W 76/15; H04W 76/32; H04W 76/34; H04W 76/36; H04W 76/12
See application file for complete search history.

(56) References Cited

OTHER PUBLICATIONS

3GPP TR 23.700-41 V0.1.0 (Feb. 2022) 3rd Generation Partnership Project; Technical Specification Group Services and System Aspects; Study on enhancement of network slicing; Phase 3 (Release 18).
3GPP TS 23.502 V17.4.0 (Mar. 2022) 3rd Generation Partnership Project; Technical Specification Group Services and System Aspects; Procedures for the 5G System (5GS); Stage 2 (Release 17).
SA WG2, "Revised WID for FS_eNS_Ph3", SP-220073, TSG SA Meeting #SP-95E Mar. 15-24, 2022, Electronic meeting.
Huawei, HiSilicon, "New solution for KI#1: Support of Network Slice Service continuity", S2-2202054, 3GPP TSG-WG SA2 Meeting #150E e-meeting Elbonia, Apr. 6-12, 2022.

* cited by examiner

USER EQUIPMENT (UE) INCLUDING FIRST SINGLE NETWORK SLICE SELECTION ASSISTANCE INFORMATION (S-NSSAI), SECOND S-NSSAI, FIRST PROTOCOL DATA UNIT (PDU) SESSION OF SESSION AND SERVICE CONTINUITY (SSC) MODE 2, AND SECOND PDU SESSION

TECHNICAL FIELD

The present invention relates to a User Equipment (UE).

BACKGROUND ART

The 3rd Generation Partnership Project (3GPP), which undertakes activities for standardizing recent mobile communication systems, has studied System Architecture Evolution (SAE) which is a system architecture for Long Term Evolution (LTE).

In addition, the 3GPP has recently studied next-generation communication technologies and system architectures for 5th Generation (5G) mobile communication systems which are next generation mobile communication systems, and in particular, has standardized a 5G System (5GS) as a system for realizing a 5G mobile communication system (see NPL 1). In the 5GS, technical problems arising from connection of various terminals to a cellular network are extracted and solutions thereto have been standardized.

CITATION LIST

Non Patent Literature

NPL 1: 3GPP TS 24.501 V17.5.0 (2021-12); 3rd Generation Partnership Project; Technical Specification Group Core Network and Terminals; Non-Access-Stratum (NAS) protocol for 5G System (5GS); Stage 3 (Release 17)

NPL 2: 3GPP TR 23.700-41 V0.1.0 (2022-02); 3rd Generation Partnership Project; Technical Specification Group Services and System Aspects; Study on enhancement of network slicing; Phase 3 (Release 18)

SUMMARY OF INVENTION

Technical Problem

For the 5G System (5GS), a 5G Core Network (5GCN) which is a new core network has been studied for the purpose of providing various services.

Furthermore, for the 5G, a network slice that corresponds to a logical network providing specific network functions and specific network characteristics has been defined for a specific service type or a specific group. For example, the network slice may be a logical network provided for terminals with a low latency function, or may be a logical network provided for sensor terminals used in the Internet of Things (IoT).

Furthermore, the 3GPP has studied Enhancement of Network Slicing (eNS) to study further functions associated with network slices. As a study of phase 3 of eNS, the 3GPP has studied a technique for continuing services of a PDU session in a network slice in a case that the network slice is congested in a case that there is no mobility, in a case that network performance of the network slice does not satisfy a service level agreement (also referred to as an SLA) in a case that there is no mobility, in a case that the network slice is congested in a case that there is mobility, or the like (see NPL 2).

However, there is no obvious implementation method for satisfying the above-described demands.

The present invention has been made in light of the above circumstances, and aims to provide a method of implementing functions for an NS and/or an SNPN in the 5GS.

Solution to Problem

A User Equipment (UE) according to an embodiment of the present invention includes a transmission and/or reception unit and a controller. The transmission and/or reception unit receives a PDU session release command message including S-NSSAI. The controller releases a first PDU session. The transmission and/or reception unit transmits the S-NSSAI and a PDU session establishment request message. The controller establishes a second PDU session.

Advantageous Effects of Invention

According to the present invention, it is possible to provide a unit for continuing services of a PDU session in a network slice in a case that the network slice is congested in a case that there is no mobility, in a case that network performance of the network slice does not satisfy a service level agreement (also referred to as an SLA) in a case that there is no mobility, in a case that the network slice is congested in a case that there is mobility, or the like.

DESCRIPTION OF EMBODIMENTS

Preferred embodiments for carrying out the present invention will be described below with reference to the drawings. Note that an embodiment of a mobile communication system to which the present invention is applied will be described as an example in the present embodiment.

1. OVERVIEW OF SYSTEM

Figure 1:
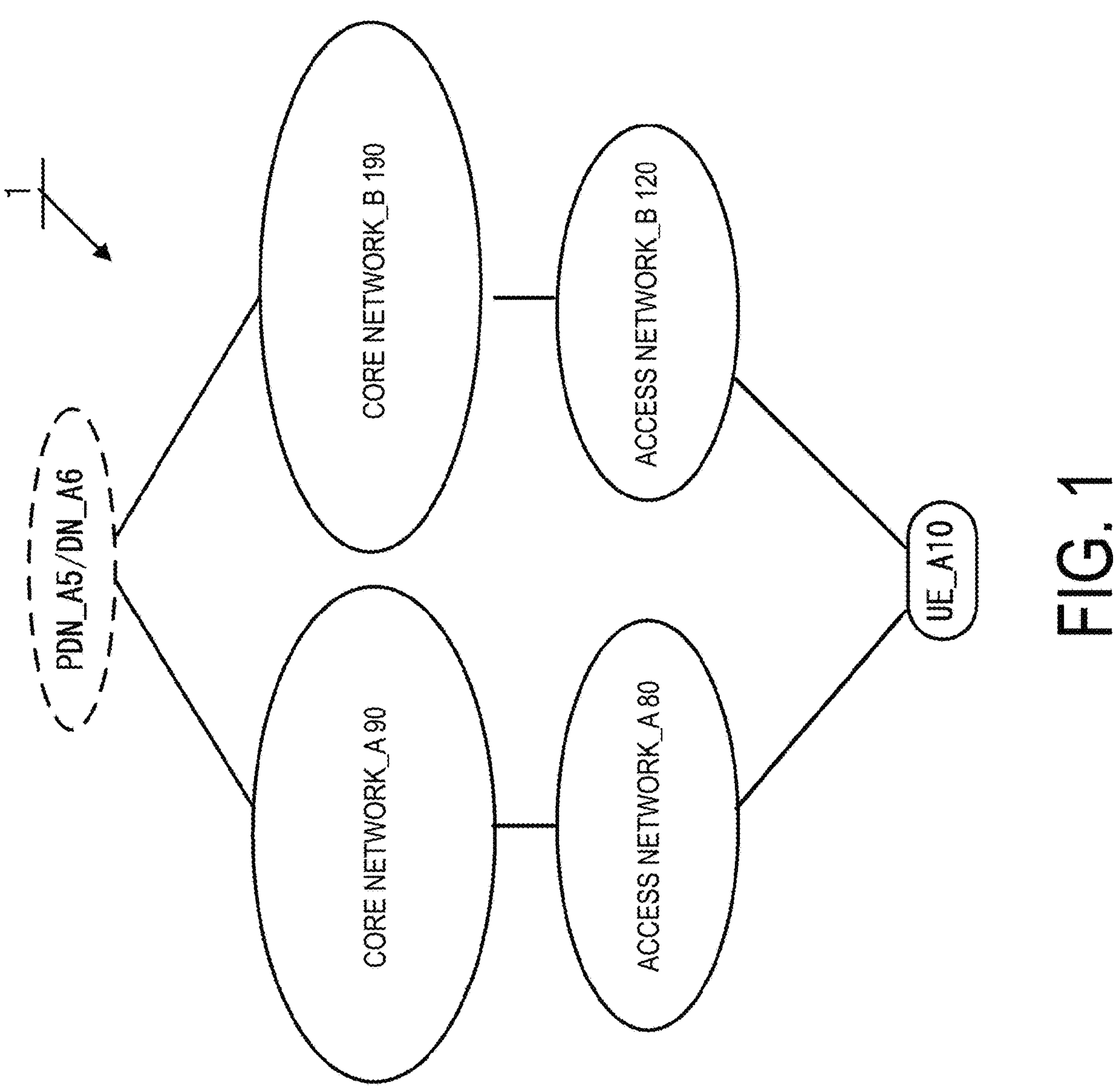
FIG. 1 is a diagram illustrating an overview of a mobile communication system (EPS/5GS).
Figure 2:
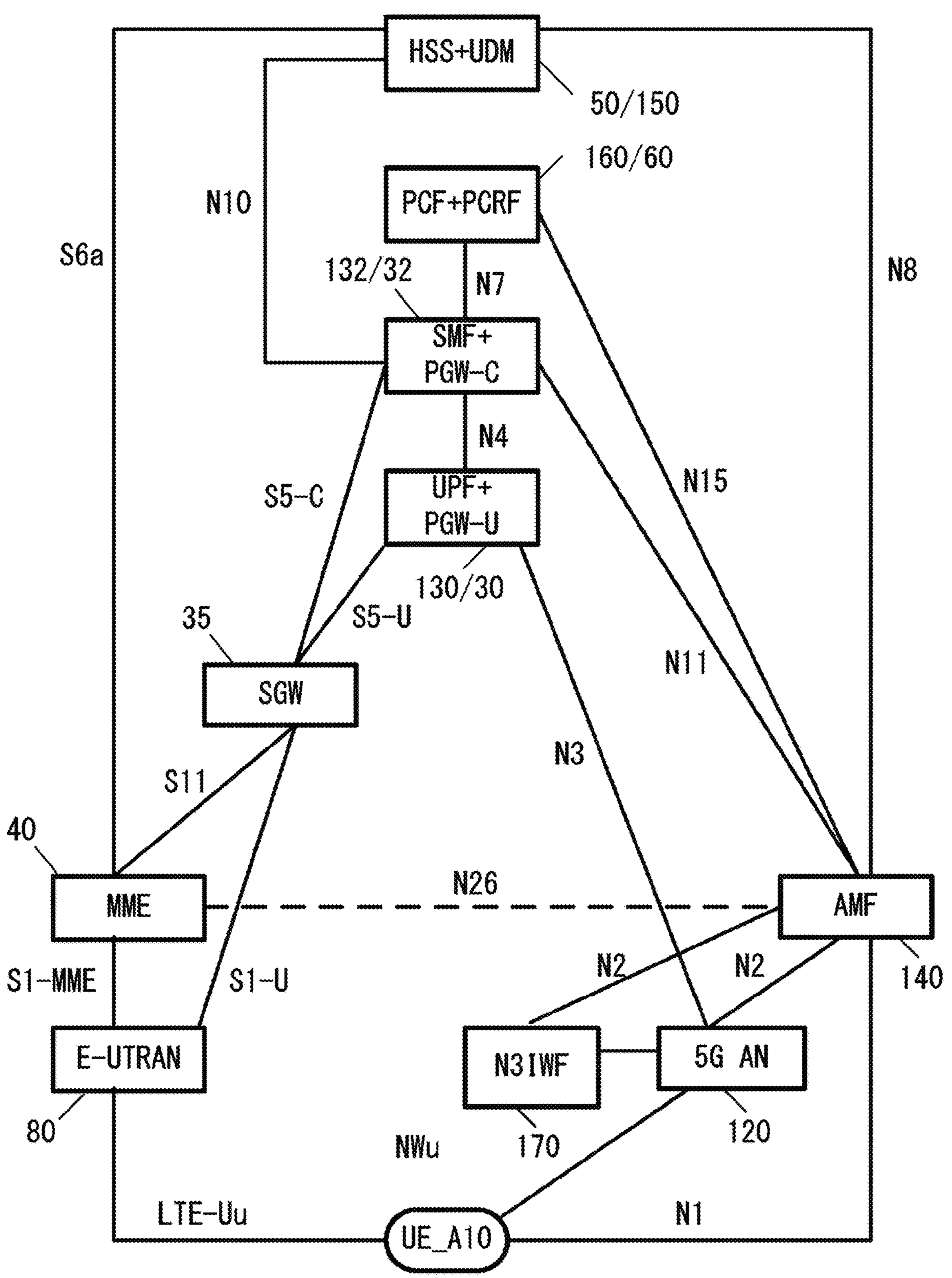
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

FIG. 1 illustrates the mobile communication system 1 including UE_A 10, an access network_A 80, a core network_A 90, a Packet Data Network (PDN)_A 5, an access network_B 120, a core network_B 190, and a Data Network (DN)_A 6.

In the following description, the reference numerals of these apparatuses and functions may be omitted, as in UE, an access network_A, a core network_A, a PDN, an access network_B, a core network_B, a DN, and the like.

In addition, FIG. 2 illustrates apparatuses and functions such as the UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the reference numerals of these apparatuses and functions may be omitted as in UE, an E-UTRAN, an MME, an SGW, a PGW-U, a PGW-C, a PCRF, an HSS, a 5G AN, an AMF, a UPF, an SMF, a PCF, a UDM, an N3IWF, and the like.

Note that an Evolved Packet System (EPS) that is a 4G system includes an access network_A and a core network_A and may further include UE and/or a PDN. In addition, a 5G System (5GS) that is a 5G system includes UE, an access network_B, and a core network_B and may further include a DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as user equipment or a terminal apparatus.

In addition, the access network_A corresponds to an Evolved Universal Terrestrial Radio Access Network (E-UTRAN) and/or a wireless LAN access network. In the E-UTRAN, one or multiple evolved Node-B (eNBs) 45 are deployed. Note that, in the following description, the reference numeral of the eNB 45 may be omitted as in eNB. In addition, in a case that there are multiple eNBs, the eNBs are connected to each other via, for example, an X2 interface. In addition, one or multiple access points are deployed on the wireless LAN access network.

In addition, the access network_B corresponds to a 5G access network (5G AN). The 5G AN includes an NG Radio Access Network (NG-RAN) and/or a non-3GPP access network. One or multiple NR Node-Bs (gNBs) 122 are deployed on the NG-RAN. Note that, in the following description, the reference numeral of the gNB 122 may be omitted, as in eNB. The gNB is a node that provides a New Radio (NR) user plane and control plane to the UE, and is connected to a 5GCN via an NG interface (including an N2 interface or an N3 interface). In other words, the gNB is a base station apparatus newly designed for the 5GS and has functions different from those of the base station apparatus (eNB) used in the EPS that is a 4G system. In addition, in a case that there are multiple gNBs, the gNBs are connected to each other via, for example, an Xn interface.

In addition, a non-3GPP access network may be an untrusted non-3GPP access network or a trusted non-3GPP access network. Here, the untrusted non-3GPP access network may be a non-3GPP access network that does not manage security on the access network, for example, a public wireless LAN. On the other hand, the trusted non-3GPP access network may be an access network defined by the 3GPP and may include a trusted non-3GPP access point (TNAP) and a trusted non-3GPP Gateway function (TNGF).

The NG-RAN refers to a radio access network connected to the 5GCN, and may use NR and/or E-UTRA. In other words, the NG-RAN may be an E-UTRAN.

In addition, in the following description, the E-UTRAN and the NG-RAN may be referred to as 3GPP access. In addition, the wireless LAN access network and the non-3GPP AN may be referred to as non-3GPP access. In addition, nodes deployed on the access network_B may also be collectively referred to as NG-RAN nodes.

In addition, in the following description, the access network_A, and/or the access network_B, and/or an apparatus included in the access network_A, and/or an apparatus included in the access network_B may be referred to as an access network or an access network apparatus. The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

In addition, the core network_B corresponds to a 5G Core Network (5GCN). An Access and Mobility Management Function (AMF), a User Plane Function (UPF), a Session Management Function (SMF), a Policy Control Function (PCF), a Unified Data Management (UDM), and the like are deployed on the 5GCN. Here, the 5GCN may be referred to as a 5GC.

In addition, in the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a mobile communication (Mobile Network Operator (MNO)) connecting the access network (the access network_A and/or the access network_B) and the PDN and/or the DN, a core network for a mobile communication operator that operates and manages the mobile communication system 1, or a core network for a virtual mobile communication operator and a virtual mobile communication service provider such as a Mobile Virtual Network Operator (MVNO) and a Mobile Virtual Network Enabler (MVNE).

The core network (the core network_A and/or the core network_B) and the access network (access network_A and/or the access network_B) may differ for each mobile communication operator.

In addition, although FIG. 1 illustrates a case that the PDN and the DN are the same, the PDN and the DN may be different. The PDN may be a Data Network (DN) that provides communication services to the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In addition, in the following, at least some of the access network_A, the core network_A, the PDN, the access network_B, the core network_B, and the DN, and/or one or multiple apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or multiple apparatuses included in these transmit and/or receive a message and/or perform a procedure".

In addition, the UE can be connected to the access network. In addition, the UE can be connected to the core network over the access network. Furthermore, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using an IP, and data is transmitted and/or received using IP packets. Each IP packet includes an IP header and a payload part. In the payload part, data transmitted and/or received by the apparatuses and functions included in the EPS and the apparatuses and functions included in the 5GS may be included. In addition, non-IP communication refers to data communication performed using no IP, in which data is transmitted and/or received in a form different from the structure of an IP packet. For example, non-IP communication may be data communication implemented through transmission and/or reception of application data to which an IP header is not added, or user data transmitted and/or received by the UE may be transmitted and/or received with another header such as a MAC header and an Ethernet (trade name) frame header added.

In addition, apparatuses which are not illustrated in FIG. 2 may be included in the access network_A, the core network_A, the access network_B, the core network_B, the PDN_A, and the DN_A. For example, the core network_A and/or the core network_B and/or the PDN_A and/or the DN_A may include an Authentication Server Function (AUSF) and an Authentication, authorization, and accounting (AAA) server (AAA-S). The AAA server may be deployed outside the core network.

Here, the AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

The AAA server is an apparatus that is connected directly to the AUSF or indirectly to the AUSF via another network apparatus and has authentication, authorization, and billing functions. The AAA server may be a network apparatus within the core network. Note that the AAA server may not be included in the core network_A and/or the core network_B and may be included in a PLMN and/or an SNPN. In other words, the AAA server may be a core network apparatus or may be an apparatus outside the core network. For example, the AAA server may be a server apparatus within a PLMN and/or an SNPN managed by a third party.

In the present document, the term "NW" may mean a core network, may mean an access network, or may mean both.

Note that, although each of the apparatuses and functions is illustrated one by one for simplicity in FIG. 2, multiple similar apparatuses and functions may be included in the mobile communication system 1. Specifically, multiple apparatuses and functions such as multiple pieces of UE_A 10, E-UTRANs 80, MMEs 40, SGWs 35, PGW-Us 30, PGW-Cs 32, PCRFs 60, HSSs 50, 5G ANs 120, AMFs 140, UPFs 130, SMFs 132, PCFs 160, and/or UDMs 150 may be included in the mobile communication system 1.

In addition, the mobile communication system 1 may include apparatus(es) and/or function(s) other than the above, and for example, include a Network Slice Selection Function (NSSF).

2. CONFIGURATION OF EACH APPARATUS

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. In addition, at least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. In addition, each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. In addition, each storage unit can store identification information, control information, flags, parameters, and the like included in a control message transmitted and/or received in various communication procedures to be described later. In addition, each storage unit may store these pieces of information for each UE. In addition, in a case that each storage unit performs interworking between the 5GS and the EPS, each storage unit can store a control message and user data transmitted and/or received to and/or from the apparatuses and functions included in the 5GS and/or the EPS. In this case, not only data transmitted and/or received over the N26 interface but also data transmitted and/or received without using the N26 interface can be stored.

2.1. Apparatus Configuration of UE

Figure 3:
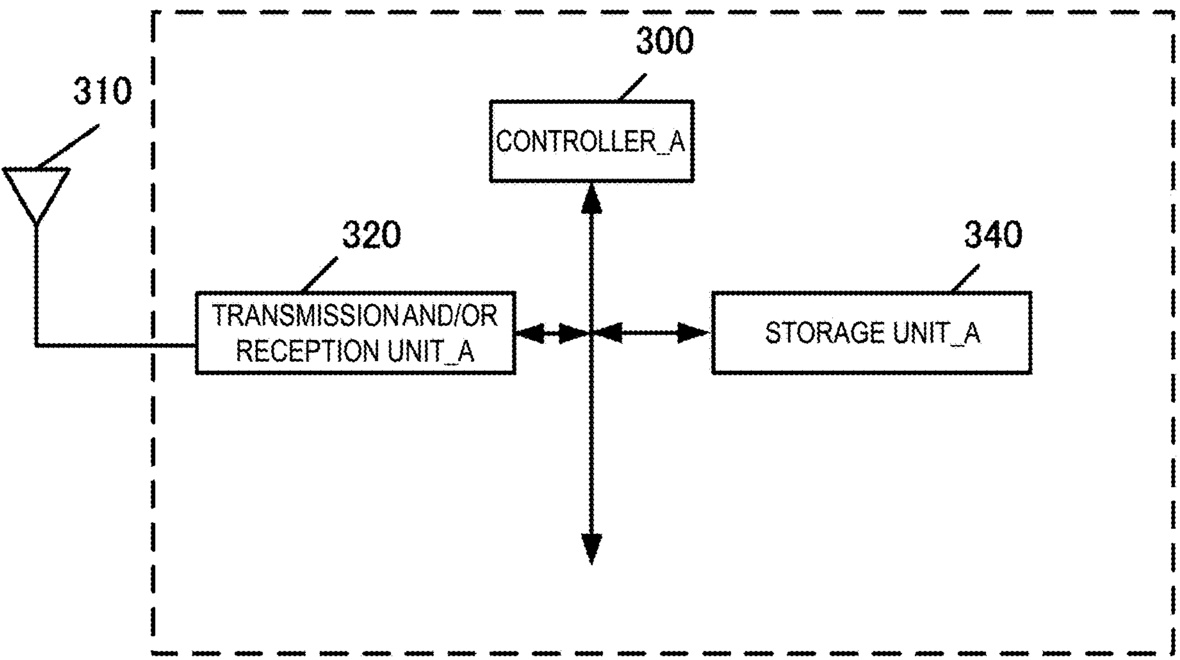
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 is connected to the antenna 310.

The controller_A 300 is a function unit that controls overall operations and functions of the UE. The controller_A 300 reads and performs various programs stored in the storage unit_A 340 as necessary, and thereby implements various types of processing in the UE.

The transmission and/or reception unit_A 320 is a function unit that performs radio communication with a base station apparatus (the eNB or the gNB) within the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

To provide detailed description with reference to FIG. 2, by using the transmission and/or reception unit_A 320, the UE can communicate with the base station apparatus (eNB) within the E-UTRAN over an LTE-Uu interface. In addition, the UE can communicate with the base station apparatus (gNB) within the 5G AN with the use of the transmission and/or reception unit_A 320. In addition, the UE can transmit and/or receive a Non-Access-Stratum (NAS) message to and/or from the AMF over an N1 interface with the use of the transmission and/or reception unit_A 320. However, the N1 interface is a logical interface, and thus communication between the UE and the AMF is actually performed over the 5G AN.

The storage unit_A 340 is a function unit that stores programs, user data, control information, and the like necessary for each operation of the UE.

2.2. Apparatus Configuration of gNB

Figure 4:
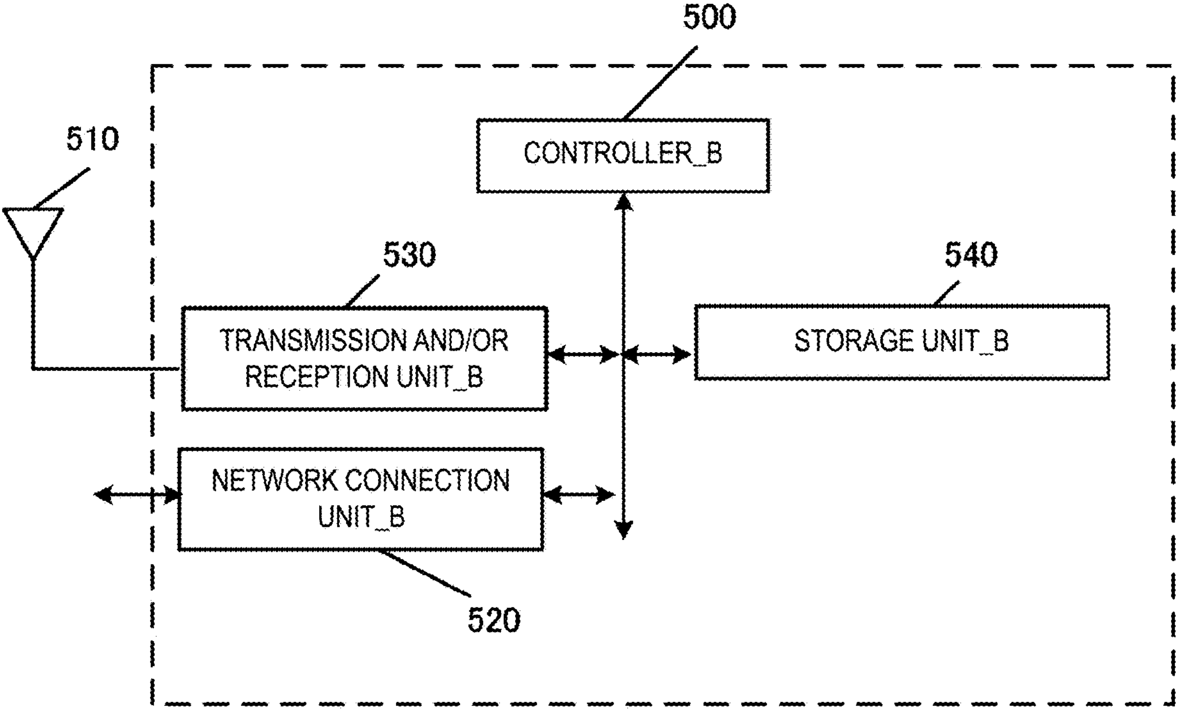
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 is connected to the antenna 510.

The controller_B 500 is a function unit that controls overall operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit that performs radio communication with the UE via the antenna 510. In other words, with the use of the transmission and/or reception unit_B 530, the gNB can transmit and/or receive user data and/or control information to and/or from the UE.

To provide detailed description with reference to FIG. 2, by using the network connection unit_B 520, the gNB within the 5G AN can communicate with the AMF over the N2 interface and can communicate with the UPF over the N3 interface. In addition, the gNB can communicate with the UE with the use of the transmission and/or reception unit_B 530.

The storage unit_B 540 is a function unit that stores programs, user data, control information, and the like necessary for each operation of the gNB.

2.3. Apparatus Configuration of AMF

Figure 5:
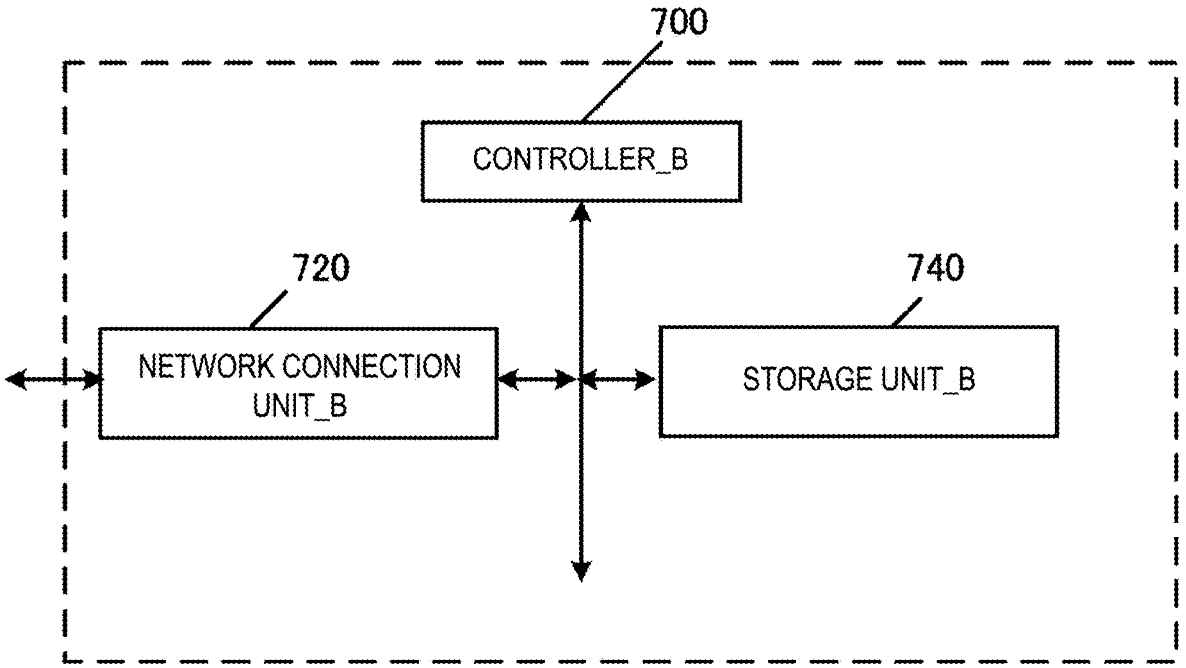
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles a control plane.

The controller_B 700 is a function unit that controls overall operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB) within the 5G AN, and/or the SMF, and/or the PCF, and/or the UDM, and/or an SCEF. In other words, with the use of the network connection unit_B 720, the AMF can transmit and/or receive user data and/or control information to and/or from the base station apparatus (gNB) in the 5G AN, and/or the SMF, and/or the PCF, and/or the UDM, and/or the SCEF.

To provide detailed description with reference to FIG. 2, by using a network connection unit_A 620, the AMF within the 5GCN can communicate with the gNB over the N2 interface, can communicate with the UDM over an N8 interface, can communicate with the SMF over an N11 interface, and can communicate with the PCF over an N15 interface. In addition, the AMF can transmit and/or receive a NAS message to and/or from the UE over the N1 interface with the use of the network connection unit_A 620. However, the N1 interface is a logical interface, and thus communication between the UE and the AMF is actually performed over the 5G AN. In addition, in a case that the AMF supports an N26 interface, the AMF can communicate with the MME over the N26 interface with the use of the network connection unit_A 620.

The storage unit_B 740 is a function unit that stores programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal to an/or from the UE via the N3IWF, a function of authenticating the UE connected via the N3IWF, and the like.

In addition, in registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, because the UE is not registered with the network, the AMF is in a state of being unable to reach the UE, because a UE context in the AMF does not have location information and routing information that are valid for the UE. In addition, in the RM-REGISTERED state, because the UE is registered in the network, the UE can receive a service that requires registration with the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is in 5GMM-REGISTERED, the UE_A 10 may start transmission and/or reception of user data and a control message, or may respond to paging. Furthermore, note that, in a case that each apparatus is in 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is unable to reach the UE_A 10. Note that, in a case that each apparatus is in 5GMM-DEREGISTERED, the UE_A 10 may initiate the registration procedure, or may perform the registration procedure to thereby establish the 5GMM context.

In addition, in connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signalling connection established with the AMF via the N1 interface. In addition, in the CM-IDLE state, the UE has neither connection of the N2 interface (N2 connection) nor connection of the N3 interface (N3 connection). On the other hand, in the CM-CONNECTED state, the UE has NAS signalling connection established with the AMF via the N1 interface. In addition, in the CM-CONNECTED state, the UE may have connection of the N2 interface (N2 connection) and/or connection of the N3 interface (N3 connection).

Furthermore, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). Furthermore, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

In addition, one or multiple AMFs may be deployed within the core network_B. In addition, the AMF may be an NF that manages one or multiple Network Slice Instances (NSIs). In addition, the AMF may be a common CP function (Common Control Plane Network Function (CPNF) (CCNF)) shared among multiple NSIs.

Note that, in a case that the UE connects to the 5GS over non-3GPP access, the N3IWF is an apparatus and/or a function deployed between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls overall operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

To provide detailed description with reference to FIG. 2, by using of the network connection unit_A 620, the SMF in the 5GCN can communicate with the AMF over the N11 interface, can communicate with the UPF over the N4 interface, can communicate with the PCF over an N7 interface, and can communicate with the UDM over an N10 interface.

The storage unit_B 740 is a function unit that stores programs, user data, control information, and the like necessary for each operation of the SMF.

The SMF has a Session Management function for managing establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of signaling arrival of downlink data (Downlink Data Notification), a function of providing SM information specific to an AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls overall operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB) within the 5G AN, and/or the SMF, and/or the DN. In other words, with the use of the network connection unit_B 720, the UPF can transmit and/or receive user data and/or control information to and/or from the base station apparatus (gNB) within the 5G AN, and/or the SMF, and/or the DN.

To provide detailed description with reference to FIG. 2, by using the network connection unit_A 620, the UPF within the 5GCN can communicate with the gNB over the N3 interface, can communicate with the SMF over the N4 interface, can communicate with the DN over an N6 interface, and can communicate with another UPF over an N9 interface.

The storage unit_B 740 is a function unit that stores programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QOS) processing function for the user plane, a function of verifying uplink traffic, a function of triggering buffering of downlink packets and Downlink Data Notification, and the like.

In addition, the UPF may be a gateway for IP communication and/or non-IP communication. In addition, the UPF may have a function of transferring IP communication, or a function of conversion between non-IP communication and IP communication. Furthermore, multiple deployed gateways may be gateways for connecting the core network_B and a single DN. Note that the UPF may have connectivity with another NF, and may be connected to each apparatus via another NF.

Note that a user plane refers to user data that is transmitted and/or received between the UE and a network. The user plane may be transmitted and/or received using a PDN connection or a PDU session. Furthermore, in a case of the EPS, the user plane may be transmitted and/or received using an LTE-Uu interface, and/or an S1-U interface, and/or an S5 interface, and/or an S8 interface, and/or an SGi interface. Furthermore, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, a control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and an S1-MME interface. Furthermore, in a case of the 5GS, the control plane may be transmitted and/or received using the interface between the UE and the NG RAN and the N2 interface. The control plane may be hereinafter referred to as a control plane, or may be hereinafter referred to as a C-Plane.

Furthermore, the U-Plane (User Plane (UP)) may be a communication path for transmitting and/or receiving user data, and may include multiple bearers. Furthermore, the C-Plane (Control Plane (CP)) may be a communication path for transmitting and/or receiving a control message, and may include multiple bearers.

2.6. Other Apparatuses and/or Functions and/or Terminology in Present Embodiment Next, other apparatuses and/or functions and/or terminology and/or identification information transmitted and/or received, stored, and managed by each apparatus and/or messages will be described.

A network refers to at least some of the access network_B, the core network_B, and the DN. One or multiple apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A session management (SM) message (also referred to as a Non-Access-Stratum (NAS) SM message) may be a NAS message used in a procedure for SM, or may be a control message transmitted and/or received between the UE_A 10 and the SMF_A 230 via the AMF_A 240. Furthermore, the SM message may include a PDU session establishment request message, a PDU session establishment accept message, a PDU session reject message (PDU session establishment reject message), a PDU session modification request message, a PDU session modification command message, a PDU session modification completion message (PDU session modification complete), a PDU session modification command reject message, a PDU session modification reject message, a PDU session release request message, a PDU session release reject message, a PDU session release command message, a PDU session release completion message, and the like.

The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by the network (NW).

A Mobility management (MM) message (also referred to as a NAS MM message) may be a NAS message used in a procedure for MM, or may be a control message transmitted and/or received between the UE_A 10 and the AMF_A 240. Furthermore, the MM message may include a Registration request message, a Registration accept message, a Registration reject message, a De-registration request message, a De-registration accept message, a configuration update command message, a configuration update completion message, a Service request message, a Service accept message, a Service reject message, a Notification message, a Notification response message, and the like.

The procedure for MM or the MM procedure may include a Registration procedure, a De-registration procedure, a Generic UE configuration update procedure, an authentication and authorization procedure, a Service request procedure, a Paging procedure, and a Notification procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non EPS service.

A Packet Data Network (PDN) type indicates a type of PDN connection and includes IPv4, IPV6, IPv4v6, and non-IP. In a case that IPv4 is specified, it indicates that transmission and/or reception of data is performed using IPv4. In a case that IPv6 is specified, it indicates that transmission and/or reception of data is performed using IPV6. In a case that IPv4v6 is specified, it indicates that transmission and/or reception of data is performed using IPv4 or IPV6. In a case that non-IP is specified, it indicates that communication is performed using a communication method other than the IP, not communication using the IP.

Although a Protocol Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using the PDU session.

Note that each apparatus (the UE, and/or the access network apparatus, and/or the core network apparatus) may associate one or multiple pieces of identification information with a PDU session for management. Note that these pieces of identification information may include one or multiple of a DNN, a QoS rule, a PDU session type, application identification information, NSI identification information, access network identification information, and an SSC mode (also referred to as an SSC mode), and may further include other pieces of information. In addition, in a case that multiple PDU sessions are established, pieces of identification information associated with the PDU sessions may have the same or different details.

The Data Network Name (DNN) may be identification information for identifying the core network and/or an external network such as the DN. In addition, the DNN can also be used as information for selecting a gateway such as the PGW_A 30/UPF_A 235 connecting the core network_B190. In addition, the DNN may correspond to an Access Point Name (APN).

A Protocol Data Unit/Packet Data Unit (PDU) session type indicates a type of PDU session and includes IPv4, IPV6, Ethernet, and Unstructured. In a case that IPv4 is specified, it indicates that transmission and/or reception of data is performed using IPv4. In a case that IPv6 is specified, it indicates that transmission and/or reception of data is performed using IPV6. In a case that Ethernet is specified, it indicates that transmission and/or reception of an Ethernet frame is performed. Alternatively, Ethernet may indicate that communication using the IP is not performed. In a case that Unstructured is specified, it indicates that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPV4 and IPV6.

The Public land mobile network (PLMN) is a communication network that provides mobile radio communication services. The PLMN is a network managed by an operator who is a (mobile) network operator, and the operator can be identified by a PLMN ID. In the present document, the PLMN may mean the PLMN ID. A PLMN that matches a Mobile Network Code (MNC) and a Mobile Country Code (MCC) of an International Mobile Subscriber Identity (IMSI) of the UE may be a Home PLMN (HPLMN). The PLMN may mean a core network.

Furthermore, the UE may hold, in a USIM, an Equivalent HPLMN list for identifying one or multiple Equivalent HPLMNs (EHPLMNs). A PLMN different from the HPLMN and/or the EHPLMN may be a Visited PLMN (VPLMN).

The PLMN that the UE has successfully registered may be a Registered PLMN (RPLMN). Each apparatus may receive and/or hold and/or store, from the RPLMN, an Equivalent PLMN list for identifying one or multiple Equivalent PLMNs (EPLMNs) that can be used equivalently to the RPLMN in the PLMN selection performed by the UE.

The current PLMN may be a PLMN requested by the UE and/or a PLMN selected by the UE and/or the RPLMN and/or the PLMN allowed by the network and/or the PLMN to which the core network apparatus transmitting and/or receiving messages belongs to.

The requested PLMN means a message transmission destination network in a case that the UE transmits a message. Specifically, the requested PLMN may be a PLMN selected by the UE in a case that the UE transmits a message. The requested PLMN may be a current PLMN requested by the UE. Also, the requested PLMN may be a registered PLMN in a case that the UE is in a registered state.

A Non-public network (NPN) is a network intended for non-public specifications. There are two types of NPN including a Stand-alone non-public network (SNPN) and a Public network integrated non-public network (PNI-NPN). The SNPN and PNI-NPN may be deployed in the 5GS. In the present document, in a case that NPN is referred to, it may mean an SNPN or a PNI-NPN or both.

A Stand-alone non-public network (SNPN) is a network that is operated by an NPN operator and does not depend on the network functions provided by a PLMN. In other words, an SNPN is a network independent of a PLMN and can only be accessed by certain UEs. The SNPN is identified with a PLMN ID and a Network identifier (NID).

Here, a PLMN ID for identifying an SNPN does not need to be unique. For example, one or more PLMN IDs reserved to be used in a private network may be used for an NPN.

A Stand-alone Non-Public Network (SNPN) is a network that is identified by an SNPN ID composed of a combination of a PLMN ID and a Network identifier (NID) and to which only specific UE is allowed to connect. The SNPN may mean a core network. Here, the UE that is allowed to access the SNPN may be an SNPN enabled UE.

Furthermore, the UE may hold, in the USIM, an Equivalent SNPN list for identifying one or multiple Equivalent SNPNs (ESNPNs). An SNPN different from a HSNPN and/or an ESNPN may be a Visited PLMN (VPLMN).

The SNPN with which the UE has been successfully registered may be a Registered SNPN (RSNPN). Each apparatus may receive and/or hold and/or store, from the RSNPN, equivalent SNPN list for identifying one or multiple Equivalent PLMNs (ESNPNs) that can be used equivalently to the RSNPN in the PLMN selection or SNPN selection performed by the UE.

A Public network integrated non-public network (PNI-NPN) is an NPN deployed with support of a PLMN. In other words, it is a network that uses the functions of a PLMN to implement private specifications.

Onboarding services in SNPN allows an MS (UE) to access the SNPN indicating onboarding using default UE credentials.

A registration procedure for onboarding services in SNPN may be an Initial registration for onboarding services in SNPN. Additionally or alternatively, the registration procedure for an onboarding service in SNPN may be a registration procedure for registration update due to mobility in a case that a UE has been registered for the onboarding service in SNPN. The registration procedure for an onboarding service in SNPN may be referred to as SNPN onboarding registration.

In the registration procedure for an onboarding service in SNPN, MM-based slice admission control may not be performed by the AMF or the NF in the core network for the S-NSSAI for the onboarding service in SNPN.

In addition, a network slice (NS) is a logical network that provides specific network capability and network characteristics. The UE and/or the network can support the network slice (NW slice (NS)) in the 5GS. The network slice may be referred to simply as a slice.

In addition, a network slice instance (NSI) includes a set of an instance (entity) of a network function (NF) and necessary resources and forms a network slice to be mapped. Here, the NF is a processing function for a network, and is adopted or defined by the 3GPP. The NSI is an entity of one or multiple NSs configured in the core network_B. In addition, the NSI may include a virtual Network Function (NF) generated using a Network Slice Template (NST).

Here, the NST is associated with a resource request for provision of a requested communication service and capability, and is a logical expression of one or multiple NFs. In other words, the NSI may be a set of multiple NFs on the core network_B 190. The NSI may be a logical network configured for classifying user data to be delivered depending on a service or the like. In the NS, one or multiple NFs may be configured. Each NF configured in the NS may or may not be an apparatus shared with another NS.

The UE and/or the apparatus in the network can be allocated to one or multiple NSs, based on an NSSAI, and/or an S-NSSAI, and/or a UE usage type, and/or registration information such as one or multiple NSI IDs, and/or an APN. Note that the UE usage type is a parameter value included in registration information of the UE, which is used for identifying the NSI. The UE usage type may be stored in the HSS. The AMF may select the SMF and the UPF based on the UE usage type.

In addition, Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating an operation of the NS expected in terms of functions and services. In addition, the SD may be information for interpolating an SST in a case that one NSI is selected out of multiple NSIs indicated by the SST. The S-NSSAI may be information unique to each PLMN or SNPN or may be standard information common to PLMNs or SNPNs.

In addition, the S-NSSAI may also be transmitted and/or received between apparatuses using S-NSSAI IEs of the 5GS, in that case, the S-NSSAI may include S-NSSAI (SST and/or SD) associated with the current PLMN or SNPN and/or S-NSSAI (SST and/or SD) of an HPLMN (if any. For example, at a time when a UE performs roaming or in a case that the current PLMN or SNPN is a VPLMN or an SNPN).

In addition, a network may store one or multiple pieces of S-NSSAI in the registration information of the UE as default S-NSSAI. Note that, in a case that the S-NSSAI is default S-NSSAI and the UE does not transmit, to a network, valid S-NSSAI in a registration request message, the network may provide an NS related to the UE.

In addition, the S-NSSAI transmitted and/or received between the UE and the NW may be referred to as an S-NSSAI Information element (IE). Furthermore, an S-NSSAI IE transmitted and/or received between the UE and the NW may include S-NSSAI including the SST and/or SD of the registered PLMN or SNPN and/or the SST and/or SD indicating S-NSSAI of the HPLMN or HSNPN to which the aforementioned S-NSSAI is mapped. One or multiple pieces of S-NSSAI stored in the UE and/or the NW may include the SST and/or the SD, or include the S-NSSAI including the SST and/or the SD and/or the SST and/or the SD indicating the S-NSSAI of the HPLMN to which the S-NSSAI is mapped.

In addition, the Network Slice Selection Assistance Information (NSSAI) is a set of pieces of the S-NSSAI. Each piece of the S-NSSAI included in the NSSAI is information for assisting the access network or the core network to select an NSI. The UE may store the NSSAI allowed by the network for each PLMN or SNPN. In addition, the NSSAI may be information used for selecting the AMF. The UE may apply, to the PLMN and EPLMN or the SNPN and ESNPN, each piece of NSSAI (allowed NSSAI and/or configured NSSAI and/or rejected NSSAI and/or pending NSSAI).

The mapped S-NSSAI is the S-NSSAI of the HPLMN mapped to the S-NSSAI of the registered PLMN in a roaming scenario. The UE may store one or multiple pieces of mapped S-NSSAI mapped to the S-NSSAI included in the configured NSSAI and the allowed NSSAI of each access type. Furthermore, the UE may store one or multiple pieces of mapped S-NSSAI of the S-NSSAI included in the rejected NSSAI and/or the pending NSSAI.

In a case that the SNPN roaming scenario is supported, the mapped S-NSSAI may be S-NSSAI of the HSNPN mapped to the S-NSSAI of the registered SNPN.

A Network Slice-Specific Authentication and Authorization (NSSAA) function is a function for implementing network slice-specific authentication and authorization. The network slice-specific authentication and authorization allows the UE to be authenticated and authorized outside the core network, such as in a 3rd Party. The PLMN or the SNPN and the network apparatus having the NSSAA function can perform an NSSAA procedure on certain S-NSSAI, based on registration information of the UE. Furthermore, the UE having the NSSAA function can manage, store, and transmit and/or receive the pending NSSAI and the third rejected NSSAI. In the present document, NSSAA may be referred to as a network slice-specific authentication and authorization procedure or an authentication and authorization procedure.

The S-NSSAI that requires NSSAA is S-NSSAI that requires NSSAA managed by the core network and/or the core network apparatus. Furthermore, at the time of roaming, the S-NSSAI requiring the NSSAA may be S-NSSAI other than that of the HPLMN or HSNPN, which is managed by the core network and/or the core network apparatus, and in which the S-NSSAI of the HPLMN or HSNPN requiring the NSSAA is mapped S-NSSAI.

The core network and/or the core network apparatus may store the S-NSSAI that requires NSSAA by associating the S-NSSAI with information indicating whether NSSAA is required. Furthermore, the core network and/or the core network apparatus may store the S-NSSAI requiring the NSSAA in association with information indicating whether NSSAA has completed or information indicating that NSSAA has completed and been allowed or succeeded. The core network and/or the core network apparatus may manage the S-NSSAI requiring NSSAA as information unrelated to the access network.

In addition, configured NSSAI is NSSAI fed and stored in the UE. The UE may store the configured NSSAI for each PLMN or SNPN. The UE may store the configured NSSAI in association with the PLMN or SNPN.

Note that, in the present document, the configured NSSAI associated with the PLMN may be referred to as configured NSSAI with respect to the PLMN, configured NSSAI of the PLMN, configured NSSAI for the PLMN, or configured NSSAI associated with the PLMN. Similarly, the configured NSSAI associated with the SNPN may be expressed as configured NSSAI with respect to the SNPN, configured NSSAI of the SNPN, configured NSSAI for the SNPN, or configured NSSAI associated with the SNPN.

In addition, the UE may store configured NSSAI that is not associated with the PLMN and is valid for all PLMNs, and such configured NSSAI may be defined as "default configured NSSAI". Similarly, the UE may store configured NSSAI that is not associated with the SNPN and is valid for all SNPNs, and such configured NSSAI may be defined as "default configured NSSAI". The UE may store configured NSSAI that is associated with neither the PLMN nor the SNPN and is valid for all PLMNs and SPNMs, and such configured NSSAI may be defined as "default configured NSSAI".

The configured NSSAI may be associated with multiple PLMNs or SNPNs, these multiple PLMNs may be EPLMNs, or multiple SNPNs may be ESNPNs.

The configured NSSAI may be information configured by a network (or a PLMN or an SNPN). The S-NSSAI included in the configured NSSAI may be referred to as configured S-NSSAI. The configured S-NSSAI may be transmitted and/or received using S-NSSAI IEs, and in this case, the configured S-NSSAI may include S-NSSAI (SST and/or SD) and mapped S-NSSAI (SST of mapped HPLMN or the SNPN and/or SD of mapped HPLMN or SNPN) (if any. For example, at a time when the UE performs roaming or in a case that the associated PLMN or SNPN is a VPLMN or VSNPN).

Alternatively, the S-NSSAI (SST and/or SD) of the PLMN or the SNPN and the S-NSSAI (SST and/or SD) of the HPLMN or the SNPN may be treated independently. Specifically, the configured S-NSSAI of the PLMN or the SNPN may be referred to as "configured S-NSSAI for the PLMN or the SNPN" or "configured S-NSSAI of the PLMN or the SNPN" or "configured S-NSSAI with respect to the PLMN or the SNPN".

Furthermore, one or more pieces of S-NSSAI of the HPLMN or the HSNPN to which the configured S-NSSAI is mapped may be referred to as "one or more pieces of mapped S-NSSAI with respect to the configured NSSAI of the PLMN or the SNPN" or "one or more pieces of mapped S-NSSAI of the configured NSSAI of the PLMN or the SNPN".

In other words, the UE may store "configured NSSAI of the current PLMN or SNPN" included in the S-NSSAI of the current PLMN or SNPN, and further during roaming, the UE may store "one or more pieces of mapped S-NSSAI with respect to the configured NSSAI of the current PLMN or SNPN". The one or more pieces of mapped S-NSSAI with respect to the configured NSSAI may be mapped S-NSSAI(s) for the configured NSSAI of the 3GPP.

The configured NSSAI may be updated by the NW at an arbitrary timing, and the updated configured NSSAI may be transmitted from the NW to the UE based on the update.

In addition, requested NSSAI is NSSAI provided to the network from the UE during the registration procedure. In the registration procedure, the S-NSSAI included in the requested NSSAI transmitted by the UE may be S-NSSAI included in the allowed NSSAI or the configured NSSAI stored in the UE.

The requested NSSAI may be information indicating a network slice requested by the UE. The S-NSSAI included in the requested NSSAI may be referred to as requested S-NSSAI. For example, the requested NSSAI is included and transmitted and/or received in a Non-Access-Stratum (NAS) message transmitted from the UE to the network, such as a registration request message or a PDU session establishment request message, or in a Radio Resource Control (RRC) message including the NAS message. Here, in a roaming case, the requested NSSAI may include S-NSSAI of a VPLMN and the S-NSSAI of a mapped HPLMN. In other words, the S-NSSAI included in the requested NSSAI (requested S-NSSAI) may include S-NSSAI and mapped S-NSSAI.

The requested NSSAI may be information including one or multiple pieces of S-NSSAI associated with a network slice requested by the UE. Note that the network slice requested by the UE may be a network slice that the UE wants to use, or a network slice that the UE requests to be allowed to use by the network. The S-NSSAI included in the requested NSSAI may be S-NSSAI included in the configured NSSAI associated with the current PLMN, or may be S-NSSAI included in allowed NSSAI associated with the current PLMN.

In other words, requested NSSAI may be S-NSSAI included in the configured NSSAI associated with one or multiple current PLMNs, S-NSSAI included in the allowed NSSAI associated with one or multiple current PLMNs, or a combination of the two configurations described above. More specifically, the allowed NSSAI associated with the current PLMN may be allowed NSSAI associated with the current PLMN and the current access type. Furthermore, the requested NSSAI may be requested NSSAI of the 5GS.

Note that, the S-NSSAI included in the requested NSSAI may be S-NSSAI that is stored in the UE but not included in the rejected NSSAI associated with the current PLMN or SNPN, and/or S-NSSAI that is stored in the UE but not included in pending NSSAI associated with the current PLMN or SNPN, or S-NSSAI that is stored in the UE but not included in the fourth rejected NSSAI associated with the current PLMN or SNPN.

Furthermore, the S-NSSAI included in the requested NSSAI may be S-NSSAI for which the back-off timer associated with the S-NSSAI and/or the mapped S-NSSAI of the S-NSSAI is not running for the UE.

In addition, the allowed NSSAI is information indicating one or multiple network slices allowed for the UE. In other words, the allowed NSSAI is information identifying a network slice to which the UE is allowed to connect by the network. The allowed NSSAI may be allowed NSSAI stored in the UE and/or the NW, or allowed NSSAI transmitted from the NW to the UE. In this case, the allowed NSSAI may refer to an allowed NSSAI IE of the 3GPP.

The allowed NSSAI IE transmitted from the NW to the UE may include a list of pieces of the S-NSSAI of the current PLMN or SNPN that are valid for the current PLMN or SNPN at the time of no roaming.

At the time of roaming, the allowed NSSAI IE transmitted from the NW to the UE may include a list pieces of the S-NSSAI of the current PLMN or SNPN that are valid for the current PLMN or SNPN and also a list of pieces of mapped S-NSSAI that is the S-NSSAI of the HPLMN or HSNPN to which the S-NSSAI of the current PLMN or SNPN is further mapped.

Note that the list of pieces of S-NSSAI of the current PLMN or SNPN that are included in the allowed NSSAI IE and are valid for the current PLMN or SNPN may be referred to as Allowed NSSAI, and the list of pieces of mapped S-NSSAI that are S-NSSAI of the HPLMN or HSNPN to which the S-NSSAI of the current PLMN or SNPN is mapped may be referred to as a list of pieces of mapped S-NSSAI of the Allowed NSSAI. Here, the list of pieces of mapped S-NSSAI of the Allowed NSSAI may be mapped S-NSSAI(s) for the allowed NSSAI for a PLMN of the 3GPP. Similarly, the Allowed NSSAI may mean allowed NSSAI for a PLMN or an SNPN of the 3GPP.

The UE and/or the NW may store and manage the allowed NSSAI for each access (the 3GPP access or the non-3GPP access), as information regarding the UE. The UE and/or the NW may further manage the allowed NSSAI in association with the registration area.

Furthermore, the UE and/or the NW may store and manage the allowed NSSAI in association with the PLMN or the SNPN as information regarding UE. The allowed NSSAI may be associated with multiple PLMN, these multiple PLMNs may be EPLMNs, or multiple SNPNs may be ESNPNs.

Note that, in the present document, the allowed NSSAI associated with the PLMN or SNPN and the access type may be referred to as "allowed NSSAI with respect to the PLMN or SNPN and the access type" or "allowed NSSAI with respect to the access type of the PLMN or SNPN".

The S-NSSAI included in the allowed NSSAI may be referred to as an allowed S-NSSAI. The allowed S-NSSAI may be transmitted and/or received using S-NSSAI IEs, and in this case, the allowed S-NSSAI (SST and/or SD) may include S-NSSAI and mapped S-NSSAI (SST of mapped HPLMN or the SNPN and/or SD of mapped HPLMN or SNPN) (if any. For example, at a time when the UE performs roaming or in a case that the associated PLMN or SNPN is a VPLMN or VSNPN).

Alternatively, the S-NSSAI (SST and/or SD) of the PLMN or the SNPN and the S-NSSAI) of the HPLMN or the SNPN (SST of the mapped HPLMN or SNPN and/or SD of the mapped HPLMN or SNPN may be treated independently. Specifically, the Allowed S-NSSAI of the PLMN or the SNPN may be expressed as "allowed S-NSSAI for the PLMN or the SNPN" or "allowed S-NSSAI of the PLMN or the SNPN" or "allowed S-NSSAI with respect to the PLMN or the SNPN".

Furthermore, one or more pieces of S-NSSAI of the HPLMN or the HSNPN to which the allowed S-NSSAI is mapped may be referred to as "one or more pieces of mapped S-NSSAI with respect to the allowed NSSAI of the PLMN or the SNPN" or "one or more pieces of mapped S-NSSAI of the allowed NSSAI of the PLMN or the SNPN".

In addition, the rejected NSSAI is information indicating one or multiple network slices not allowed for the UE to use or request. In other words, the rejected NSSAI is information identifying a network slice to which the UE is not allowed to connect by the network. The rejected NSSAI transmitted from the NW to the UE may be included in a rejected NSSAI IE or an Extended rejected NSSAI IE.

The rejected NSSAI transmitted and/or received by using the rejected NSSAI IE may be information including one or multiple combinations of S-NSSAI (SST and/or SD) and a rejection cause value (rejected S-NSSAI). The rejected NSSAI transmitted and/or received using an Extended rejected NSSAI IE may be, during roaming, information including one or more combinations (Rejected S-NSSAI) of S-NSSAI (SST and/or SD) and mapped S-NSSAI (SST of the mapped HPLMN or SNPN and/or SD of the mapped HPLMN or SNPN) (if any. For example, at a time when the UE performs roaming, or in a case that the associated PLMN or SNPN is the VPLMN or VSNPN) and the rejection cause value.

The Extended rejected NSSAI IE may include one or more sets of Rejected S-NSSA and/or NSSAI (Partial extended rejected NSSAI list in the 5GS), and the set of Rejected S-NSSAI may include information indicating the type of the set.

The information indicating the type of the set may be, for example, information indicating that the set includes one or more pieces of rejected S-NSSAI (SST and/or SD) with associated back-off timer values, or information indicating that the set does not include associated back-off timer values but includes one or more pieces of rejected S-NSSAI (SST and/or SD).

In a case that the information indicating the type of the set is information indicating that one or more pieces of rejected S-NSSAI are included in the set together with the associated back-off timer value, the set of Rejected S-NSSAI may include the back-off timer value.

Here, the S-NSSAI included in the rejected NSSAI may be associated with a PLMN ID or an SNPN ID. Note that a PLMN or a SNPN indicated by a PLMN ID or an SNPN ID with which the S-NSSAI included in the rejected NSSAI is associated may be the current PLMN or the current SNPN. Alternatively, the PLMN ID or the SNPN ID with which the S-NSSAI included in the rejected NSSAI is associated may be information indicating the HPLMN or the HSNPN regardless of the current PLMN or SNPN.

Here, the rejection cause value is information indicating the reason that the network rejects the corresponding S-NSSAI or a combination (if any) of the corresponding S-NSSAI and the mapped S-NSSAI. The UE and/or network may store and manage each piece of S-NSSAI and/or mapped S-NSSAI (if any) as appropriate rejected NSSAI and/or mapped S-NSSAI of the rejected NSSAI based on the rejection cause value with which each S-NSSA or a combination of the corresponding S-NSSAI and the mapped S-NSSAI is associated.

Furthermore, the rejected NSSAI may be included in the NAS message transmitted from the network to the UE, such as a registration accept message, a configuration update command, or a registration reject message, or in an RRC message including a NAS message. The S-NSSAI included in the rejected NSSAI may be referred to as rejected S-NSSAI.

The rejected NSSAI may be transmitted by using a Rejected NSSAI IE or may be transmitted by using an Extended rejected NSSAI IE in a case that the UE is roaming. The Extended rejected NSSAI IE may include one or multiple pieces rejected S-NSSAI (IE) including the S-NSSAI of the current PLMN or SNPN (SST and/or SD), the mapped S-NSSAI (SST of the mapped HPLMN or SNPN and/or SD of the mapped HPLMN or SNPN) and the rejection cause value, and it may be understood that the UE has been rejected to request the received S-NSSAI of the current PLMN or SNPN to the NW together with the received mapped S-NSSAI. Meanwhile, the Rejected NSSAI IE may include the rejected S-NSSAI IE according to the S-NSSAI of the current PLMN or SNPN and the rejection cause value, and it may be understood that the UE has been rejected to request the received S-NSSAI of the current PLMN or SNPN or S-NSSAI associated with the S-NSSAI of the HPLMN or HSNPN from the NW.

The rejected NSSAI may be any one of the first to fourth rejected NSSAI, one or more pieces of mapped S-NSSAI with respect to the rejected NSSAI, one or more pieces of mapped S-NSSAI with respect to the second rejected NSSAI, and one or more pieces of mapped S-NSSAI with respect to the fourth rejected NSSAI, or may be a combination thereof. The S-NSSAI included in the rejected NSSAI may be referred to as rejected S-NSSAI. The rejected S-NSSAI may be transmitted and/or received between apparatuses by using S-NSSAI IEs, and an S-NSSAI IE indicating the rejected NSSAI may include S-NSSAI and mapped S-NSSAI.

The UE and/or the NW may store and manage the rejected NSSAI in association with the PLMN or the SNPN as information regarding the UE. The rejected NSSAI may be further associated with the other one or multiple PLMNs or SNPNs, and the other one or multiple PLMNs may be EPLMNs, and the other one or multiple SNPNs may be ESNPNs.

Note that, in the present document, the rejected NSSAI associated with the PLMN or the SNPN may be referred to as rejected NSSAI with respect to the PLMN or the SNPN, rejected NSSAI of the PLMN or the SNPN, or rejected NSSAI for the PLMN or the SNPN. The UE and/or the NW may further store second rejected NSSAI and/or second rejected S-NSSAI in association with a registration area. The UE and/or the NW may store the second rejected NSSAI and/or the second rejected S-NSSAI in association with an access type and/or a registration area.

Here, the first rejected NSSAI is a set of one or multiple pieces of the S-NSSAI available in the current PLMN or the current SNPN. The first rejected NSSAI may be rejected NSSAI for the current PLMN or SNPN in the 5GS, may be rejected S-NSSAI for the current PLMN or SNPN, may be S-NSSAI included in the rejected NSSAI for the current PLMN or SNPN, may be mapped S-NSSAI(s) for rejected S-NSSAI for the current PLMN or SNPN, or may be S-NSSAI included in mapped S-NSSAI(s) for rejected S-NSSAI for the current PLMN or SNPN. The list (set) of pieces of mapped S-NSSAI of the first rejected NSSAI may be one or multiple pieces of mapped S-NSSAI with respect to the first rejected NSSAI or mapped S-NSSAI(s) for the rejected NSSAI for the current PLMN or SNPN of the 5GS. The first rejected NSSAI may be rejected NSSAI stored by the UE or the NW or may be rejected NSSAI transmitted from the NW to the UE.

In a case that the first rejected NSSAI is rejected NSSAI transmitted from the NW to the UE, one or multiple S-NSSAIs rejected because they are unavailable in the current PLMN or the current SNPN among the S-NSSAIs included in the requested NSSAI transmitted from the UE to the NW are included. In this case, the first rejected NSSAI may be information including one or multiple combinations of the S-NSSAI and the rejection cause value. The rejection cause value at this time may be "S-NSSAI not available in the current PLMN or SNPN" or may be information indicating that the S-NSSAI associated with the rejection cause value is not available in the current PLMN or SNPN. The S-NSSAI included in the first rejected NSSAI may be referred to as first rejected S-NSSAI.

In a case that the first rejected NSSAI is rejected NSSAI transmitted from the NW to the UE, the first rejected NSSAI may be included and transmitted and/or received in the rejected NSSAI IE or the Extended rejected NSSAI IE. The rejected NSSAI IE or the Extended rejected NSSAI IE may include at least one combination of the S-NSSAI of the current PLMN or SNPN and the rejection cause value. In a case that the UE is roaming, the foregoing combination may further include mapped S-NSSAI that is S-NSSAI of the HPLMN.

In other words, in a roaming case, the first rejected NSSAI transmitted from the NW to the UE may include at least one combination of the S-NSSAI of the current PLMN or SNPN, the mapped S-NSSAI, and the rejection cause value.

The first rejected NSSAI may be applied to all of registered PLMNs or SNPNs. The UE and/or NW may handle the first rejected NSSAI and the S-NSSAI included in the first rejected NSSAI as information regardless of the access type. In other words, the first rejected NSSAI may be information valid for 3GPP access and non-3GPP access.

In a case that the UE transitions to a deregistered state on both the 3GPP access and the non-3GPP access for the current PLMN, the UE may delete the first rejected NSSAI from storage. In other words, the UE deletes the first rejected NSSAI in a case that the UE transitions to the deregistered state for the current PLMN via certain access, in a case that the UE successfully registers with a new PLMN via certain access, in a case that the UE fails to register with a new PLMN via certain access and transitions to the deregistered state, or in a case that the UE is not registered (deregistered state) via other access. In other words, in a case that the UE transitions to a deregistered state with respect to the current PLMN via certain access and the UE is in a state of being registered (registered state) with the current PLMN via the other access, the UE need not delete the first rejected NSSAI.

The S-NSSAI included in the first rejected NSSAI or the first rejected NSSAI may be referred to as S-NSSAI of the current PLMN. In other words, the S-NSSAI included in the first rejected NSSAI or the first rejected NSSAI may be stored and/or managed and/or transmitted and/or received only in association with the current PLMN ID or SNPN ID. Additionally or alternatively, the S-NSSAI included in the first rejected NSSAI may be S-NSSAI of the HPLMN, or may be an S-NSSAI of the current PLMN.

Second rejected NSSAI is a set of one or multiple pieces of the S-NSSAI that are not available in the current registration area. The second rejected NSSAI may be rejected NSSAI for the current registration area of the 5GS, mapped S-NSSAI(s) for rejected NSSAI for the current registration area, or S-NSSAI included in the mapped S-NSSAI(s) for rejected NSSAI for the current registration area. The list (set) of pieces of mapped S-NSSAI of the second rejected NSSAI may be one or multiple pieces of mapped S-NSSAI with respect to the second rejected NSSAI, or mapped S-NSSAI(s) for the rejected NSSAI for the current registration area of the 5GS. The second rejected NSSAI may be rejected NSSAI stored by the UE or the NW or may be rejected NSSAI transmitted from the NW to the UE. In a case that the second rejected NSSAI is rejected NSSAI transmitted from the NW to the UE, the second rejected NSSAI may be information including one or multiple combinations of S-NSSAI and a cause value. The rejection cause value at this time may be “S-NSSAI not available in the current registration area” or may be information indicating that the S-NSSAI associated with the cause value is not available in the current registration area. The S-NSSAI included in the second rejected NSSAI may be referred to as second rejected S-NSSAI.

In a case that the second rejected NSSAI is rejected NSSAI transmitted from the NW to the UE, one or multiple pieces of S-NSSAI rejected because they are unavailable in the current registration area among pieces of the S-NSSAI included in the requested NSSAI by the UE are included. In that case, the second rejected NSSAI may be included and transmitted and/or received in the rejected NSSAI IE or the Extended rejected NSSAI IE. The rejected NSSAI IE or the Extended rejected NSSAI IE may include at least one combination of the S-NSSAI of the current PLMN or SNPN and the rejection cause value. In a case that the UE is roaming, the foregoing combination may further include mapped S-NSSAI that is S-NSSAI of the HPLMN.

In other words, in the roaming case, the second rejected NSSAI transmitted from the NW to the UE may include at least one combination of the S-NSSAI of the current PLMN or SNPN, the mapped S-NSSAI, and the rejection cause value.

The second rejected NSSAI may be valid within the current registration area and may be applied to the current registration area. The UE and/or the NW may handle the second rejected NSSAI and the S-NSSAI included in the second rejected NSSAI as information for each access type. In other words, the second rejected NSSAI may be information valid for each of 3GPP access and non-3GPP access. In other words, once the UE transitions to the deregistered state with respect to certain access, the UE may delete the second rejected NSSAI associated with the access from the storage.

The S-NSSAI included in the second rejected NSSAI or the second rejected NSSAI may be referred to as S-NSSAI of the current PLMN. In other words, the S-NSSAI included in the second rejected NSSAI or the second rejected NSSAI may be stored and/or managed and/or transmitted and/or received only in association with the current PLMN ID or SNPN ID. Alternatively, the S-NSSAI included in the second rejected NSSAI may be S-NSSAI of the HPLMN, or may be an S-NSSAI of the current PLMN.

The third rejected NSSAI is S-NSSAI that requires NSSAA and is a set of one or multiple pieces of S-NSSAI for which the NSSAA for the S-NSSAI is failed or revoked. The third rejected NSSAI may be NSSAI stored in the UE and/or the NW or NSSAI transmitted and/or received between the NW and the UE. In a case that the third rejected NSSAI is transmitted from the NW to the UE, the third rejected NSSAI may be information including one or multiple combinations of S-NSSAI and a rejection cause value. The rejection cause value at this time may be “S-NSSAI not available due to the failed or revoked NSSAA” and may be information indicating that the NSSAA for the S-NSSAI associated with the rejection cause value has been failed or revoked. The S-NSSAI included in the third rejected NSSAI may be referred to as third rejected S-NSSAI. In a case that the third rejected NSSAI is NSSAI transmitted from the NW to the UE, the third rejected NSSAI may be transmitted and/or received by using the rejected NSSAI IE or the Extended rejected NSSAI IE.

The third rejected NSSAI may be applied to a registered PLMN or a registered SNPN, may be applied to a registered PLMN and/or an EPLMN, or may be applied to a registered SNPN and/or an ESNPN, or may be applied to all PLMNs or SNPNs. The fact that the third rejected NSSAI is applied to all the PLMNs may mean that the third rejected NSSAI is not associated with the PLMNs or may mean that the third rejected NSSAI is associated with the HPLMN or the HSNPN.

Furthermore, the UE and/or the NW may handle the third rejected NSSAI and the third rejected S-NSSAI as information regardless of the access type. In other words, the third rejected NSSAI may be valid information for 3GPP access and non-3GPP access. The third rejected NSSAI may be NSSAI different from the rejected NSSAI. The third rejected NSSAI may be the first rejected NSSAI. The third rejected NSSAI may be rejected NSSAI for the failed or revoked NSSAA of the 5GS, or may be rejected S-NSSAI for the failed or revoked NSSAA, or may be S-NSSAI included in the rejected NSSAI for the failed or revoked NSSAA.

The third rejected NSSAI is rejected NSSAI allowing the UE to identify the slice that is rejected due to failure or revocation of NSSAA from the core network. Specifically, the UE does not initiate the registration request procedure for the S-NSSAI included in the third rejected NSSAI while storing the third rejected NSSAI. The third rejected NSSAI may be identification information including one or multiple pieces of S-NSSAI received from the core network in association with the rejection cause value indicating failure of NSSAA.

The third rejected NSSAI is information regardless of the access type. Specifically, in a case that the UE stores the third rejected NSSAI, the UE may not attempt to transmit, either on 3GPP access or on non-3GPP access, a registration request message including the S-NSSAI included in the third rejected NSSAI. Alternatively, the UE can transmit the registration request message including the S-NSSAI included in the third rejected NSSAI, based on a UE policy.

Alternatively, the UE may delete the third rejected NSSAI based on the UE policy and transition to a state in which the UE can transmit the registration request message including the S-NSSAI included in the third rejected NSSAI. In other words, in a case that the UE transmits, based on the UE policy, the registration request message including the S-NSSAI included in the third rejected NSSAI, the UE may delete the S-NSSAI from the third rejected NSSAI.

The S-NSSAI included in the third rejected NSSAI at the time of roaming may be referred to as S-NSSAI of the HPLMN. In other words, the third rejected NSSAI received by the UE from the VPLMN or the VSNPN may include the S-NSSAI of the HPLMN or the HSNPN.

In other words, the UE and/or each apparatus may store a “third rejected NSSAI” in which the S-NSSAI of the HPLMN or the HSNPN is configured. That is, even at the time of roaming, the “third rejected NSSAI” may be stored without being associated with mapped S-NSSAI.

The fourth rejected NSSAI is information including one or multiple pieces of S-NSSAI that have reached the maximum number of UEs for each network slice. The fourth rejected NSSAI may be NSSAI stored by the UE or the NW, or may be NSSAI transmitted from the NW to the UE.

The fourth rejected NSSAI may be rejected NSSAI for the maximum number of UEs reached in the 5GS, may be rejected S-NSSAI for the maximum number of UEs reached, may be S-NSSAI included in the rejected NSSAI for the maximum number of UEs reached, may be mapped S-NSSAI(s) for the maximum number of UEs reached, or may be S-NSSAI included in the mapped S-NSSAI(s) for the maximum number of UEs reached. The list (set) of pieces of the mapped S-NSSAI of the fourth rejected NSSAI may be one or multiple pieces of mapped S-NSSAI with respect to the fourth rejected NSSAI, or may be mapped S-NSSAI(s) for the maximum number of UEs reached in the 5GS.

In a case that the fourth rejected NSSAI is transmitted from the NW to the UE, the fourth rejected NSSAI may be information including one or multiple pieces of information including at least one of S-NSSAI (SST and/or SD), mapped S-NSSAI (SST and/or SD) (if any), a rejection cause value, and a value of the back-off timer. The rejection cause value at this time may be "S-NSSAI having reached the maximum number of UEs for each network slice (S-NSSAI not available due to maximum number of UEs reached)" and may be information indicating that the maximum number of UEs that can give notification of or allow the S-NSSAI associated with the rejection cause value as Allowed NSSAI has been reached.

Here, the rejection cause value may be a rejection cause value included in the rejected NSSAI. Furthermore, at this time, the value of the back-off timer may be information indicating a time period during which the UE is prohibited from transmitting an MM message using the one or more pieces of S-NSSAI associated with the value of the back-off timer and/or the S-NSSAI of the current PLMN or SNPN associated with one or more pieces of mapped S-NSSAI.

The fourth rejected NSSAI may be applied to the registered PLMN and/or EPLMN, may be applied to the registered SNPN and/or ESNPN, or may be applied to one or multiple PLMNs or SNPNs to which TAIs included in a TA list (a TAI list or a registration area) belong. The UE and/or the NW may handle the fourth rejected NSSAI and the S-NSSAI included in the fourth rejected NSSAI as information for each access type.

In a case that the fourth rejected NSSAI is NSSAI transmitted from the NW to the UE, the fourth rejected NSSAI may be transmitted and/or received by using the rejected NSSAI IE or the Extended rejected NSSAI IE.

In a case that the first to fourth rejected NSSAIs are transmitted and/or received using the rejected NSSAI IE or the Extended rejected NSSAI IE, the rejected NSSAI IE and the Extended rejected NSSAI IE may include a list of rejected S-NSSAIs.

In a case that the first to fourth rejected NSSAIs are transmitted and/or received using the rejected NSSAI IE, the list of the rejected S-NSSAIs included in the rejected NSSAI IE may be one or more Rejected S-NSSAIs of the 5GS. In the Rejected S-NSSAI, the S-NSSAI (SST and/or SD) of the current PLMN or SNPN and a corresponding rejection cause value may be configured.

In a case that the first to fourth rejected NSSAIs are transmitted and/or received using the Extended rejected NSSAI IE, the list of the rejected S-NSSAIs included in the Extended rejected NSSAI IE may be a Partial extended rejected NSSAI list of the 5GS.

The list of the rejected S-NSSAIs includes a list of a first type not including the value of the back-off timer and a list of a second type including the value of the back-off timer applied to all of the S-NSSAIs included in the list of the rejected S-NSSAIs. In the Extended rejected NSSAI IE, one or more lists of the first type and/or one or more second lists may be configured.

In the list of the first type, information indicating that the list is of the first type and one or more Rejected S-NSSAIs of one or more 5GSs may be configured. In the Rejected S-NSSAI, the S-NSSAI (SST and/or SD) of the current PLMN or SNPN and a corresponding rejection cause value may be configured. In addition, in the Rejected S-NSSAI, the mapped S-NSSAI (SST and/or SD) may be configured.

The information indicating that the list is of the first type may mean that the list includes one or more S-NSSAIs not together with the value of a corresponding back-off timer. In other words, it may mean that the list does not include the value of the back-off timer corresponding to one or more S-NSSAIs included in the list.

In the list of the second type, information indicating that the list is of the second type, the back-off timer value, and one or more Rejected S-NSSAIs of the 5GS may be configured. In the Rejected S-NSSAI, the S-NSSAI (SST and/or SD) of the current PLMN or SNPN and a corresponding rejection cause value may be configured. In addition, in the Rejected S-NSSAI, the mapped S-NSSAI (SST and/or SD) may be configured.

The information indicating that the list is of the second type may be information meaning that the list includes one or more S-NSSAIs and the value of the back-off timer corresponding thereto and that the value of the back-off timer is adapted to all of the S-NSSAIs.

Note that the value of the back-off timer included in the list of the second type may be the value applied to all of the S-NSSAIs included in the same list of the second type. The pending NSSAI may be pending NSSAI of the 5GS. The pending NSSAI may be NSSAI stored in the UE and/or the NW or may be NSSAI transmitted and/or received between the NW and the UE.

In a case that the pending NSSAI is NSSAI transmitted from the NW to the UE, the pending NSSAI may be transmitted and/or received using pending NSSAI IEs configured with one or more S-NSSAI IEs, and the S-NSSAI IEs may include S-NSSAI (SST and/or SD) and the mapped S-NSSAI (SST of the mapped HPLMN or HSNPN and/or SD of the mapped HPLMN or HSNPN) (if any. For example, at a time when the UE performs roaming or in a case that the associated PLMN or SNPN is a VPLMN or VSNPN).

The pending NSSAI may be applied to all registered PLMNs or registered SNPNs, may be applied to the registered PLMNs and one or multiple EPLMNs of the registered PLMNs, or may be applied to the registered SNPNs and one or multiple ESNPN of the registered SNPNs. The UE and/or the NW may handle the S-NSSAI included in the pending NSSAI as information regardless of the access type. In other words, the pending NSSAI may be information in common to 3GPP access and non-3GPP access.

The pending NSSAI is NSSAI including one or multiple pieces of S-NSSAI identifying slices for which the UE is pending the procedure. Specifically, while storing the pending NSSAI, the UE does not initiate the registration request procedure for the S-NSSAI included in the pending NSSAI or mapped S-NSSAI of the pending NSSAI.

In other words, the UE does not use the S-NSSAI included in the stored pending NSSAI during the registration procedure until NSSAA for the S-NSSAI included in the pending NSSAI is completed. The pending NSSAI is information regardless of the access type. Specifically, in a case that the UE stores the pending NSSAI, the UE does not attempt to transmit, either on 3GPP access or on non-3GPP access, a registration request message including the S-NSSAI included in the pending NSSAI.

During roaming (roaming scenario), the S-NSSAI included in the pending NSSAI stored in the UE may be the S-NSSAI of the HPLMN or the HSNPN. In other words, the pending NSSAI IE received by the UE from the VPLMN or VSNPN may include the S-NSSAI of the HPLMN or the SNPN. The pending NSSAI may be referred to as first pending NSSAI.

In other words, the UE storing the first pending NSSAI intends not to store the mapped S-NSSAI for the first pending NSSAI, and the S-NSSAI configured for the first pending NSSAI stored in the UE is the S-NSSAI of the HPLMN or the HSNPN, regardless of roaming or non-roaming being performed.

Note that, in a case that the first pending NSSAI is transmitted from the NW to the UE, that is, the UE receives the pending NSSAI from the NW, the pending NSSAI IE including the pending NSSAI may include the mapped S-NSSAI of the current S-NSSAI, or may include only the mapped S-NSSAI.

On the other hand, during roaming (roaming scenario), the S-NSSAI included in the pending NSSAI stored in the UE may be the S-NSSAI of the current PLMN (VPLMN) or SNPN (VSNPN). In other words, the pending NSSAI received by the UE from the VPLMN or VSNPN may include the S-NSSAI of the VPLMN or VSNPN. Such pending NSSAI may be referred to as second pending NSSAI.

In other words, at the time of roaming, there may be one or more pieces of mapped S-NSSAI with respect to the second pending NSSAI. The S-NSSAI included in the second pending NSSAI may be the S-NSSAI of the current PLMN or SNPN, regardless of roaming or non-roaming being performed.

In the present document, the term "pending NSSAI" may mean the first pending NSSAI, may mean the second pending NSSAI, may mean both of the pending NSSAIs, or may mean other pending NSSAI.

A tracking area is a single or multiple ranges that can be expressed using location information of the UE_A 10 managed by the core network. The tracking area may include multiple cells. Furthermore, the tracking area may be a range in which a control message such as paging is broadcast, or may be a range in which the UE_A 10 can move without performing a handover procedure. Furthermore, the tracking area may be a routing area, may be a location area, or may be any area similar to these. The tracking area may be hereinafter a TA. The tracking area may be identified by a Tracking Area Identity (TAI) including a Tracking area code (TAC) and a PLMN.

The Registration area is a set of one or multiple TAs allocated to the UE by the AMF. Note that, while moving within one or multiple TAs included in a registration area, the UE_A 10 may be able to move without transmitting and/or receiving a signal for updating the tracking area. In other words, the registration area may be an information group indicating an area in which the UE_A 10 can move without performing a tracking area update procedure. The registration area may be identified with a TAI list including one or multiple TAIs.

A TAI included in the TAI list may belong to one PLMN or multiple PLMNs. In a case that multiple TAIs included in the TAI list belong to different PLMNs, the PLMNs may be EPLMNs.

A UE ID is information for identifying the UE. Specifically, the UE ID may be a Subscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

Management of the maximum number of UEs connected to a slice is to manage and/or control the maximum number of UEs that can be registered with the network slice or S-NSSAI simultaneously, or management and/or control of the maximum number of UEs that can establish a PDU session using the network slice or S-NSSAI simultaneously. Management of the maximum number of UEs connected to a slice may be network slice admission control (NSAC) in the 5GS. NSAC may be expressed as slice admission control.

Management and/or control of the maximum number of UEs that can be simultaneously registered in a network slice or an S-NSSAI may be referred to as MM based slice admission control (Mobility management based slice admission control). Management and/or control of the maximum number of UEs that can establish a PDU session using a network slice or S-NSSAI simultaneously may be referred to as Session management (SM) based slice admission control. The slice admission control may mean Network Slice Admission Control (NSAC).

Here, the UE registered with the network slice or the S-NSSAI may refer to the S-NSSAI indicating the network slice included in allowed NSSAI for storage. An apparatus within a network, the apparatus supporting the function to manage the maximum number of UEs connected to a slice or the function to manage and/or control the maximum number of UEs that can be registered with a network slice or S-NSSAI simultaneously can store, for each piece of S-NSSAI, whether to require management of the maximum number of UEs connected to the slice and can further check, during the registration procedure, whether the number of registered UEs has reached a certain constant corresponding to the maximum number.

Furthermore, each apparatus supporting the function to manage the maximum number of UEs connected to a slice or the function to manage and/or control the maximum number of UEs that can be registered with the network slice or S-NSSAI simultaneously is good to be able to store the fourth rejected NSSAI. In the present document, the maximum number of UEs connected to a slice may be referred to as a maximum number of UEs connected for each slice, or a maximum number of UEs that can be registered with the network slice or the S-NSSAI, or a maximum number of UEs, or a fixed value.

Session and Service Continuity (SSC) is a technique for maintaining a session and/or a service. Here, the session may mean a PDU session established between the UE and the NW, and the service may mean a service provided to the UE owing to the PDU session established between the UE and the NW. There may be various modes.

In other words, the Session and Service Continuity (SSC) mode indicates a mode of Session and Service Continuity supported by a system and/or each apparatus in the 5GC. More specifically, the SSC mode may be a mode indicating a type of session and service continuity supported by a PDU session established between the UE_A 10 and an anchor point.

Here, the anchor point may be the UPGW, or may be the UPF. The UPF may be a terminating user-plane function (TUPF). The TUPF is a terminating UPF of each interface, and includes a PDU session anchor function. In other words, the anchor point may be a PDU Session Anchor.

To switch the anchor point for SSC may be referred to as anchor relocation and/or PDU session anchor change. Note that these may be referred to as an anchor relocation procedure or a PDU session anchor change procedure.

In anchor relocation, the PDU session established in the initial state may be referred to as a first PDU session, and the PDU session established after completion of the procedure may be referred to as a second PDU session.

Note that the SSC mode may be a mode indicating a type of session and service continuity configured for each PDU session. In other words, the SSC mode may be associated with a PDU session.

Additionally/alternatively, the SSC mode may be associated with the anchor point, and may be controlled so that the SSC mode cannot be changed during a state in which the PDU session is established. During life time of the PDU session, the SSC mode associated with the PDU session may not be able to be changed. Each SSC mode will be described below.

SSC mode 1 is a mode of the session and service continuity in which the same UPF is continuously maintained as the anchor point regardless of access technology such as Radio Access Technology (RAT) and the cell used by the UE_A 10 to connect to the network. More specifically, the SSC mode 1 may be a mode in which even in a case that the mobility of the UE_A 10 occurs, the session and service continuity is achieved without changing the anchor point used by the established PDU session.

SSC mode 2 is a mode of the session and service continuity in which, in a case that one anchor point is included in a PDU session, the PDU session is first released and subsequently a PDU session is established. More specifically, the SSC mode 2 is a mode in which, in a case that relocation of the anchor point occurs, a PDU session is once deleted and then a new PDU session is established.

The SSC mode 2 is a mode of the session and service continuity in which the same UPF is continuously maintained as the anchor point only in a serving area of the UPF. More specifically, SSC mode 2 may be a mode in which session and service continuity is implemented without changing the UPF that is used in an established PDU session, on the condition that the UE_A 10 is present within the serving area of the UPF. In addition, SSC mode 2 may be a mode in which session and service continuity is implemented with the UPF that is used in an established PDU session being changed, in a case that there is occurrence of such mobility of the UE_A 10 that the UE_A 10 exits the serving area of the UPF.

Here, the serving area of the UPF may refer to an area in which one UPF can provide a session and service continuity function, or may be a subset of RATs and access networks such as cells used in a case that the UE_A 10 connects to the network. In addition, the subset of the access network may be a network including one or multiple RATs and/or cells, or may be the TA.

In session continuity in the SSC mode 2, in a case that change of the S-NSSAI is not allowed, it may be referred to as first SSC mode 2. On the other hand, in session continuity in the SSC mode 2, in a case that change of the S-NSSAI is allowed, it may be referred to as second SSC mode 2. In other words, a case that session continuity is performed in the SSC mode 2 with the S-NSSAI or the network slice being changed may be referred to as the second SSC mode 2. In yet other words, a case that the PDU session of the SSC mode 2 is continued with the S-NSSAI or the network slice being changed may be referred to as the second SSC mode 2. The term "SSC mode 2" by itself may mean the first SSC mode 2 and/or the second SSC mode 2.

SSC mode 3 is a mode of the session and service continuity in which, without releasing a PDU session between the UE and the anchor point, a PDU session can be established between a new anchor point and the UE for the same DN.

The SSC mode 3 is a mode of the session and service continuity that allows establishment of a new PDU session and/or communication path via a new UPF for the same DN before disconnecting a PDU session and/or a communication path that has been established between the UE_A 10 and the UPF. In addition, the SSC mode 3 may be a mode of the session and service continuity that allows the UE_A 10 to be multihomed.

Additionally/alternatively, the SSC mode 3 may be a mode that allows the session and service continuity using multiple PDU sessions and/or the UPFs associated with the PDU sessions. In other words, in a case of the SSC mode 3, each apparatus may implement the session and service continuity using multiple PDU sessions, or may implement the session and service continuity using multiple UPFs.

In session continuity in the SSC mode 3, in a case that change of the S-NSSAI is not allowed, it may be referred to as first SSC mode 3. On the other hand, in session continuity in the SSC mode 3, in a case that change of the S-NSSAI is allowed, it may be referred to as second SSC mode 3. In other words, a case that session continuity is performed in the SSC mode 3 with the S-NSSAI or the network slice being changed may be referred to as the second SSC mode 3. In yet other words, a case that the PDU session of the SSC mode 3 is continued with the S-NSSAI or the network slice being changed may be referred to as the second SSC mode 3. The term "SSC mode 3" by itself may mean the first SSC mode 3 and/or the second SSC mode 3.

SSC mode 4 may be the second SSC mode 2.

In other words, SSC mode 4 is a mode of the session and service continuity in which, in a case that one anchor point is included in a PDU session, the PDU session is first released and subsequently a PDU session is established with the S-NSSAI or the network slice being changed. More specifically, the SSC mode 4 is a mode in which, in a case that relocation of the anchor point occurs, a PDU session is once deleted and then a new PDU session is established with the S-NSSAI or the network slice being changed.

The SSC mode 4 is a mode of the session and service continuity in which the same UPF is continuously maintained as the anchor point with the S-NSSAI or the network slice being changed only in a serving area of the UPF. More specifically, SSC mode 4 may be a mode in which session and service continuity is implemented without changing the UPF that is used in an established PDU session with the S-NSSAI or the network slice being changed, on the condition that the UE_A 10 is present within the serving area of the UPF. In addition, SSC mode 4 may be a mode in which session and service continuity is implemented with the UPF that is used in an established PDU session being changed and with the S-NSSAI or the network slice being changed, in a case that there is occurrence of such mobility of the UE_A 10 that the UE_A 10 exits the serving area of the UPF.

Here, the serving area of the UPF may refer to an area in which one UPF can provide a session and service continuity function, or may be a subset of RATs and access networks such as cells used in a case that the UE_A 10 connects to the network. In addition, the subset of the access network may be a network including one or multiple RATs and/or cells, or may be the TA.

SSC mode 5 may be the second SSC mode 3.

In other words, the SSC mode 5 is a mode of the session and service continuity in which, without releasing a PDU session between the UE and the anchor point, a PDU session can be established between a new anchor point and the UE for the same DN, with the S-NSSAI or the network slice being changed.

The SSC mode 5 is a mode of the session and service continuity that allows establishment of a new PDU session and/or communication path via a new UPF for the same DN before disconnecting a PDU session and/or a communication path that has been established between the UE_A 10 and the UPF with the S-NSSAI or the network slice being changed. In addition, the SSC mode 5 may be a mode of the session and service continuity that allows the UE_A 10 to be multihomed.

Additionally/alternatively, the SSC mode 5 may be a mode that allows the session and service continuity using multiple PDU sessions and/or the UPFs associated with the PDU sessions. In other words, in a case of the SSC mode 5, each apparatus may implement the session and service continuity using multiple PDU sessions, or may implement the session and service continuity using multiple UPFs.

1st identification information is information indicating new S-NSSAI. The 1st identification information may be information indicating updated or changed S-NSSAI. The 1st identification information may be information indicating the S-NSSAI to be associated with the second PDU session to be newly established. The 1st identification information may be the S-NSSAI assigned to the second PDU session and/or the UE by the network.

The S-NSSAI indicated by the 1st identification information may be the same S-NSSAI as the S-NSSAI associated with the first PDU session, or may be different S-NSSAI. The SST of the S-NSSAI indicated by the 1st identification information may be the same as the SST of the S-NSSAI associated with the first PDU session, or may be different.

Additionally/alternatively, the 1st identification information is information indicating updated or changed Preference information. The 1st identification information may be information for the network to perform notification of update or change of the Preference information of a route or the anchor point included in the PDU session.

2nd identification information is information indicating a cause. The 2nd identification information may be a cause value, or may be a 5GSM cause IE. The 2nd identification information may be information indicating update or change of the Preference information. In other words, the 2nd identification information may be information indicating that the network has updated or changed the Preference information. In addition, the 2nd identification information may be information indicating update or change of the PDU session due to movement of the UE. In other words, the 2nd identification information may be information indicating that the network has updated or changed information related to the PDU session along with update of the UE location information. For example, the 2nd identification information may be information indicating that the S-NSSAI related to the PDU session becomes unavailable and change of the S-NSSAI.

The 2nd identification information may be 5GSM cause #39 "reactivation requested", or may be information indicated by 5GSM cause #39 "reactivation requested". 11th identification information is information indicating new S-NSSAI. The 11th identification information may be associated with a PDU session ID that is transmitted and/or received together. The 11th identification information may be the same as the 1st identification information.

12th identification information may be a cause value. The 12th identification information may be information indicating a request for initiation of the PDU session establishment procedure for reestablishment of the PDU session for the same DN. In addition, the 12th identification information may be information indicating a request for initiation of the PDU session establishment procedure for reestablishment of the PDU session for the same S-NSSAI, or may be information indicating a request for initiation of the PDU session establishment procedure for reestablishment of the PDU session for different S-NSSAI.

The 12th identification information may be 5GSM cause #39 "reactivation requested", or may be information indicated by 5GSM cause #39 "reactivation requested".

21 st identification information may be S-NSSAI information to be requested. The 21st identification information may be null information. The 21st identification information may be the S-NSSAI, the notification of which is provided from the NW. Specifically, the S-NSSAI included in the 21st identification information may be the S-NSSAI indicated by the 1st identification information and/or the 11th identification information.

22nd identification information may be information indicating an SSC mode to be requested. The 22nd identification information may indicate at least one of the SSC mode 1 to the SSC mode 5.

23rd identification information may be information indicating whether or not the UE supports change of the S-NSSAI according to anchor relocation. The 23rd identification information may be information indicating that the UE supports change of the S-NSSAI according to anchor relocation. The 23rd identification information may be a 5GSM capability IE and/or information included in the 5GSM capability IE, for example.

31st identification information may be information indicating whether or not the NW and/or the established PDU session supports change of the S-NSSAI according to anchor relocation. The 31 st identification information may be information indicating that the NW and/or the established PDU session supports change of the S-NSSAI according to anchor relocation. The 31st identification information may be function information, and may be information included in 5GS network feature support and/or 5GS network feature support, for example.

The 31st identification information may be associated with the SSC mode and/or the PDU session ID and/or the anchor point that is transmitted and/or received together.

32nd identification information may indicate that the NW has changed the S-NSSAI according to anchor relocation. The 32nd identification information may be changed S-NSSAI. The 32nd identification information may be the S-NSSAI IE.

35th identification information may be information indicating that the NW does not support change of the S-NSSAI according to anchor relocation, and/or information indicating that the PDU session cannot be established because the NW does not support change of the S-NSSAI according to anchor relocation. The 35th identification information may be a cause value, and may be a 5GSM cause IE, for example.

The 35th identification information may be 5GSM cause #39 "reactivation requested", or may be information indicated by 5GSM cause #39 "reactivation requested".

3. DESCRIPTION OF PROCEDURES USED IN EACH EMBODIMENT

Next, procedures used in each embodiment will be described. Note that procedures to be used in each embodiment include the PDU session modification procedure, and/or the PDU session release procedure, and/or the PDU session establishment procedure. Each procedure will be described below.

Note that, in each embodiment, a case that each of the HSS and the UDM, the PCF and the PCRF, the SMF and the PGW-C, and the UPF and the PGW-U is configured as a single apparatus (that is, the same physical hardware, or the same logical hardware, or the same software) as illustrated in FIG. 2 will be described as an example. However, the details described in the present embodiment can also be applied to a case that each of the combinations is configured as different apparatuses (that is, different pieces of physical hardware, or different pieces of logical hardware, or different pieces of software). For example, between the apparatuses/functions, data may be directly transmitted and/or received, data may be transmitted and/or received via an N26 interface between the AMF and the MME, or data may be transmitted and/or received via the UE.

3.1. PDU Session Modification Procedure

Figure 6:
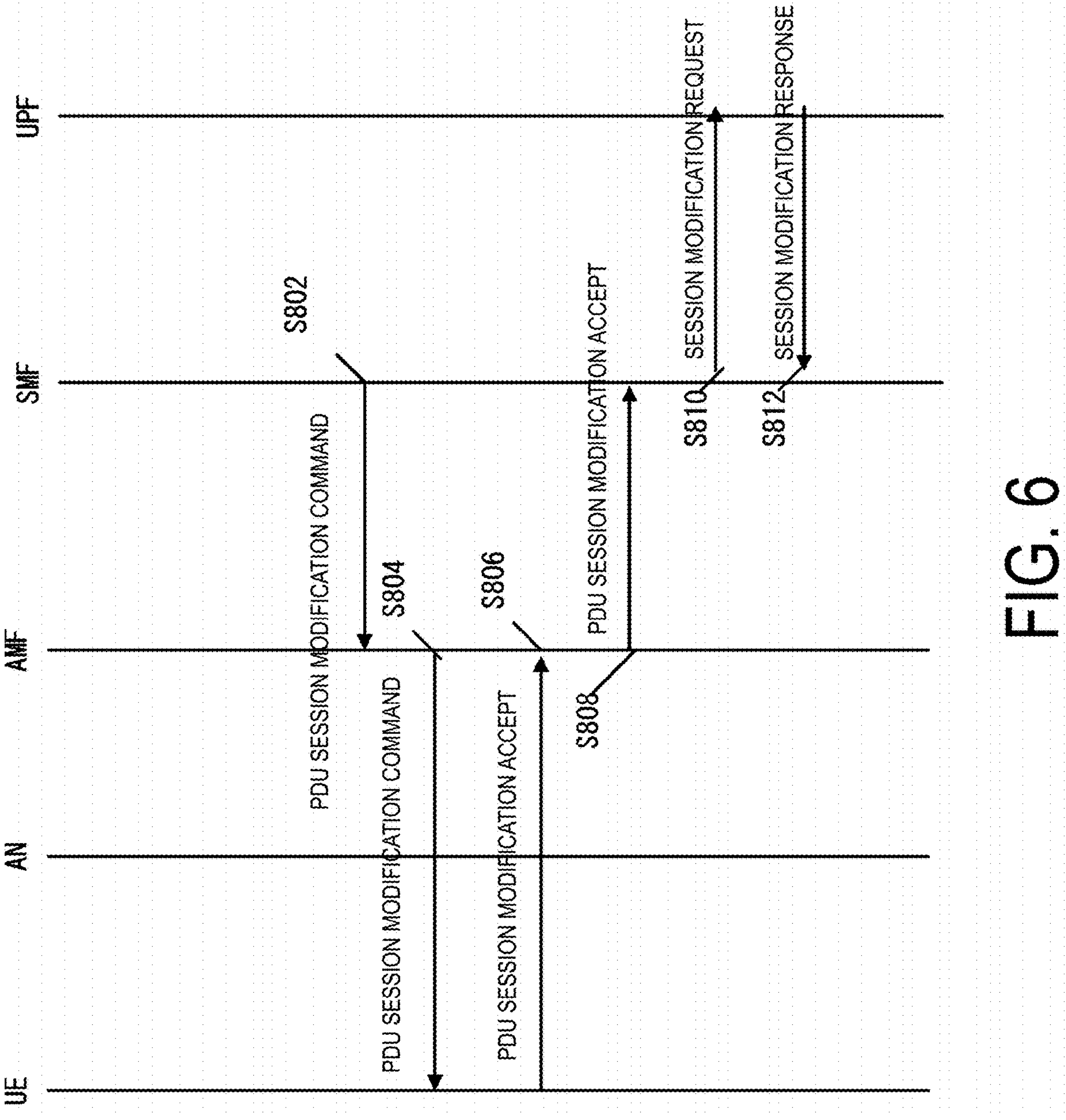
FIG. 6 is a diagram illustrating a PDU session modification procedure.

Next, behaviors of each apparatus in a case that the NW performs the PDU session modification procedure will be described with reference to FIG. 6. The PDU session modification procedure may be hereinafter referred to as the present procedure. The PDU session modification procedure may be an SM procedure.

The present procedure is a procedure for each apparatus to update the state of the PDU session. Note that each apparatus may perform the present procedure in a state after the PDU session establishment procedure has completed, or may perform the present procedure during the PDU session establishment procedure. Each apparatus may initiate the present procedure in a registered state, or may initiate the present procedure at any timing after the PDU session establishment procedure. Each apparatus may update the state of the PDU session, based on completion of the PDU session modification procedure. In addition, in a case of establishing multiple PDU sessions, each apparatus may update the state of each PDU session by performing the present procedure multiple times.

Each step of the present procedure will be described below. The SMF transmits a PDU session modification command message to the UE via the AMF (S802) (S804). Specifically, the SMF_A 230 transmits the PDU session modification command message to the AMF using the N11 interface (S802), and the AMF that has received the PDU session modification command message transmits the PDU session modification command message to the UE using the N1 interface (S804).

Note that the trigger for the SMF to transmit the PDU session modification command message may be reception of a state change notification message transmitted from the AMF, may be reception of a request message from the AF, or may be detection of state change of the SMF itself.

Note that the trigger for the SMF to transmit the PDU session modification command message may be the SMF and/or the AMF having detected that use of the S-NSSAI associated with the PDU session is to be no longer allowed. In a case that the AMF detects that use of the S-NSSAI is to be no longer allowed, the SMF may receive the state change notification message from the AMF.

In addition, the PDU session modification command message may be a NAS message transmitted and/or received on the N11 interface and the N1 interface, or may be included and transmitted and/or received in the NAS message. The PDU session modification command message is not limited to this, and may be a message indicating that modification of the PDU session is determined.

In addition, the state change notification message may be a message to be transmitted by the AMF to the SMF using the N11 interface, or may be information indicating that the state of the UE has changed due to mobility of the UE or the like. In addition, the state change notification message may be information indicating that the state of the UE and/or the network apparatus has changed due to change of subscriber information, and/or an operator policy, and/or a UE policy. In addition, the request message from the AF may be a request message transmitted from the AF, or may be a request message transmitted by another network apparatus as a representative.

Here, the SMF may include, in the PDU session modification command message, at least one or more pieces of identification information out of the first identification information to the second identification information, and may include these pieces of identification information, to thereby indicate the request of the SMF.

In addition, the SMF may transmit one or more pieces of identification information out of the first identification information to the second identification information, to thereby request change of a connection destination of the PDU session and information related to the PDU session. More specifically, the SMF may transmit the 2nd identification information and/or transmit the 2nd identification information in association with the 1st identification information, to thereby request update of preference information, request change of a default route, or perform notification of change of mobility.

The SMF may transmit the 2nd identification information and/or transmit the 1st identification information, to thereby perform notification of change of the S-NSSAI and/or new S-NSSAI.

Note that the SMF may determine which piece of identification information out of the first identification information to the second identification information is to be included in a PDU session modification request message, based on capability information of the network, and/or a policy such as the operator policy, and/or the state of the network. Note that the determination by the SMF as to which piece of identification information is to be included in the PDU session modification request message is not limited to this.

The UE may receive one or more pieces of identification information out of the first identification information to the second identification information, to thereby recognize the request of the NW. Specifically, based on reception of the 2nd identification information, the UE may recognize change of the connection destination of the PDU session and the information related to the PDU session, and recognize change of the S-NSSAI.

Additionally/alternatively, based on the 1st identification information, the UE may recognize the S-NSSAI associated with the second PDU session, and/or the S-NSSAI requested by the UE in a PDU session establishment request procedure to be performed subsequently.

Note that, in a case that the S-NSSAI indicated in the 1st identification information is not included in the Allowed NSSAI stored in the UE, before the PDU session establishment request procedure is performed, a registration request message may be transmitted, and in the registration request message, a requested NSSAI IE including the S-NSSAI indicated by the 1st identification information may be included.

The UE that has received the PDU session modification command message transmits a PDU session modification accept (PDU session establishment accept) message to the SMF via the AMF (S806) (S808).

Specifically, the UE_A 10 transmits the PDU session modification accept message to the AMF_A 240 using the N1 interface (S806), and the AMF that has received the PDU session modification request message transmits the PDU session modification accept message to the SMF using the N11 interface (S808).

Note that the PDU session modification accept message may be a NAS message transmitted and/or received on the N1 interface and the N11 interface, or may be transmitted and/or received by being included in the NAS message. The PDU session modification accept message is not limited to this, and may be a message indicating that establishment of the PDU session has been accepted.

The SMF receives the PDU session modification accept message and transmits a session modification request message (Session Modification request) to the UPF (S810), and receives a session modification accept (Session Modification response) message transmitted by the UPF that has received the session modification request message (S812). Each apparatus completes the present procedure, based on transmission and/or reception of the PDU session modification accept message and/or transmission and/or reception of the session modification response message.

Note that, in a case that the UE is not notified of the address assigned to the UE during the present procedure, the SM may transmit an RA via the UPF as the anchor point.

Through the above, each apparatus can update the state of the PDU session.

3.2. PDU Session Release Procedure

First, an overview of the PDU session release procedure will be described. The present procedure hereinafter refers to the PDU session release procedure. Note that one or multiple routes may be included in the PDU session. In other words, one or multiple anchor points may be assigned to the PDU session.

The present procedure is a procedure for each apparatus to release the PDU session. Note that each apparatus may perform the present procedure in a state after the PDU session establishment procedure has completed. Each apparatus may initiate the present procedure in a registered state, or may initiate the present procedure at any timing after the PDU session establishment procedure.

Figure 7:
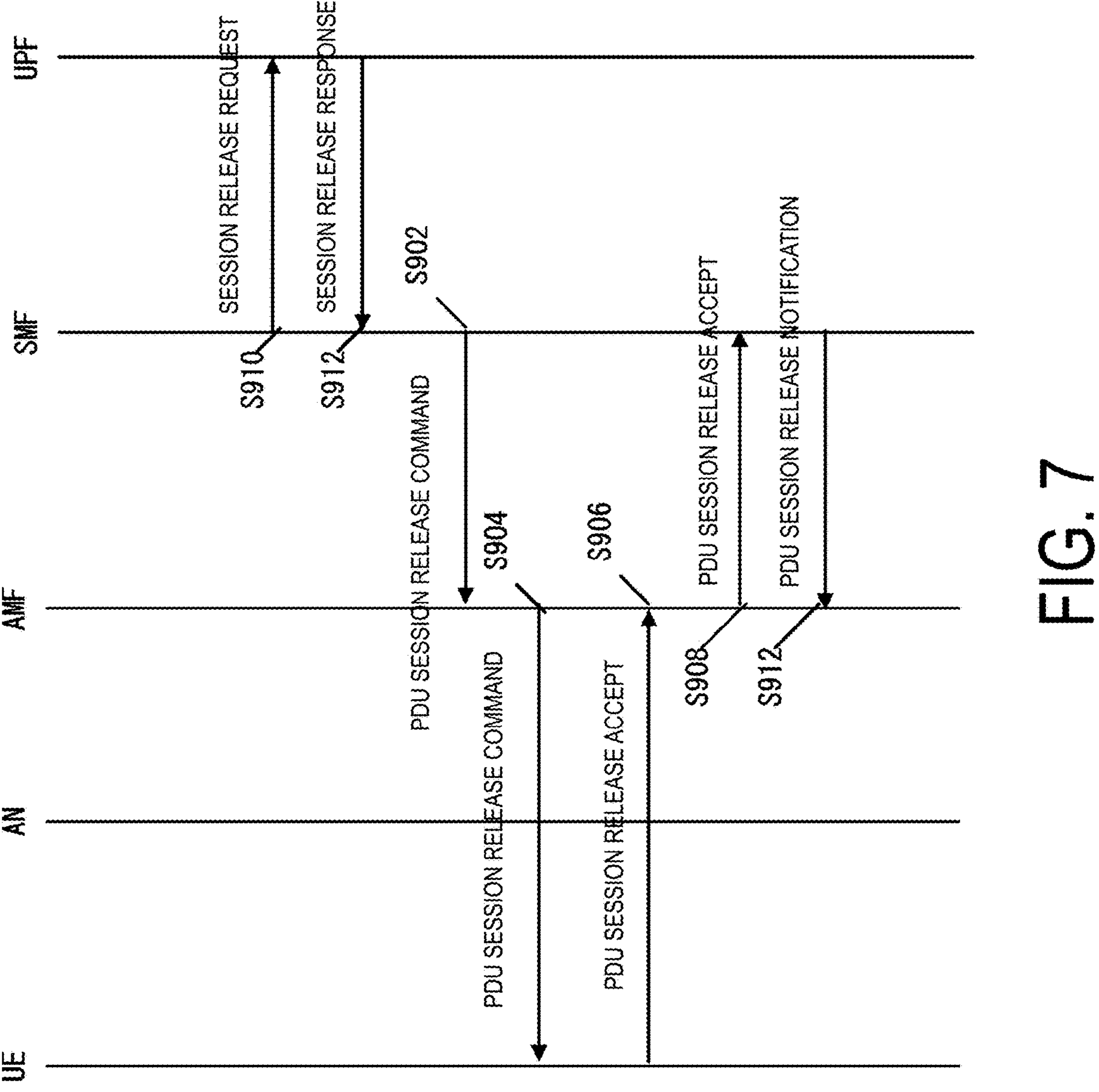
FIG. 7 is a diagram illustrating a PDU session release procedure.

An example of a procedure for performing the PDU session establishment procedure will be described below with reference to FIG. 7. Each step of the present procedure will be described below. First, the SMF determines to initiate the PDU session release procedure. A condition for the SMF to determine to initiate the PDU session release procedure may be the SMF determining to initiate performing anchor (UPF) relocation. In addition, the condition for the SMF to determine to perform anchor relocation may be reception of the state change notification message transmitted from the AMF, may be reception of the request message from the AF, or may be detection of the state change of the SMF itself.

Note that the trigger for the SMF to determine to initiate the PDU session release procedure may be the SMF and/or the AMF having detected that use of the S-NSSAI associated with the PDU session is to be no longer allowed. In a case that the AMF and/or the NSSF detects that use of the S-NSSAI is to be no longer allowed, the SMF may receive the state change notification message from the AMF and/or the NSSF. Note that the cause of determination of anchor relocation is not limited to this.

Next, the SMF transmits a Session release request message to the UPF before relocation (S910), and initiates the session release procedure between the SMF and the UPF. Here, the SMF may select one or multiple UPFs, based on determination of UPF relocation and/or based on a context already stored in the SMF. Note that, in a case that multiple UPFs are selected, the SMF may transmit the session release request message to each of the UPFs.

The UPF receives the session release request message, and deletes the context for the PDU session. In addition, based on reception of the session release request message and/or deletion of the context of the PDU session, the UPF transmits a Session release response message to the SMF (S912). In addition, the SMF receives the session release response message. Note that the session release request message and the session release response message may be a control message transmitted and/or received on the N4 interface. In addition, the session release response message may be a response message for the session release request message.

Next, based on reception of the PDU session release response message and/or determination of the PDU session anchor relocation, the SMF transmits a PDU session release command message to the UE via the AMF (S902) (S904).

Specifically, the SMF transmits the PDU session release command message to the AMF (S902), and the AMF that has received the PDU session release command message transmits the PDU session release command message to the UE (S904).

Note that the PDU session release command message may be a NAS message transmitted and/or received on the N11 interface and the N1 interface, or may be included and transmitted in the NAS message. The PDU session release command message is not limited to this, and may be a message indicating that release of the PDU session is requested from the network and/or that release of the PDU session is determined by the network.

Here, the SMF and/or the AMF may include, in the PDU session release command message and/or the NAS message, at least one or more pieces of identification information out of the 11th identification information to the 12th identification information, and may include these pieces of identification information, to thereby indicate the request for release of the PDU session.

In addition, the SMF and/or the AMF may transmit one or more pieces of identification information out of the 11th identification information to the 12th identification information, to thereby indicate that the network has accepted request for establishment of the PDU session to connect to the DN, or indicate that the network has allowed establishment of the PDU session to connect to the DN.

More specifically, the SMF and/or the AMF may transmit one or more pieces of identification information out of the 11th identification information to the 12th identification information, to thereby indicate, after the PDU session is released, to maintain the released information related to the PDU session for a certain period of time.

In addition, the SMF and/or the AMF may transmit one or more pieces of identification information out of the 11th identification information to the 12th identification information, to thereby indicate that release of the PDU session is performed for PDU session anchor relocation.

Note that the SMF and/or the AMF may determine which piece of identification information out of the 11th identification information to the 12th identification information is to be included in the PDU session release command message and/or the NAS message, based on received identification information, and/or capability information of the network, and/or a policy such as the operator policy, and/or the state of the network. Note that the determination by the SMF and/or the AMF as to which piece of identification information is to be included in the PDU session release command message and/or the NAS message is not limited to this.

The UE may receive one or more pieces of identification information out of the 11th identification information to the 12th identification information, to thereby recognize the request of the NW. Specifically, based on reception of the 12th identification information, the UE may recognize change of the connection destination of the PDU session and the information related to the PDU session, and recognize change of the S-NSSAI.

Additionally/alternatively, based on the 11th identification information, the UE may recognize the S-NSSAI associated with the second PDU session, and/or the S-NSSAI requested by the UE in a PDU session establishment request procedure to be performed subsequently.

Note that, in a case that the S-NSSAI indicated in the 11th identification information is not included in the Allowed NSSAI stored in the UE, before the PDU session establishment request procedure is performed, a registration request message may be transmitted, and in the registration request message, a requested NSSAI IE including the S-NSSAI indicated by the 11th identification information may be included.

The UE receives the PDU session release command message, and transmits a PDU session release accept message to the SMF via the AMF (S906) (S908).

Specifically, the UE transmits the PDU session release accept message to the AMF using the N1 interface (S906), and the AMF that has received the PDU session release accept message transmits the PDU session release accept message to the SMF using the N11 interface (S908).

Note that the PDU session release accept message may be a NAS message transmitted and/or received on the N1 interface and the N11 interface, or may be included and transmitted and/or received in the NAS message. The PDU session release accept message may be, but is not limited to, a response message for the PDU session release command message, and may be a message indicating that the PDU session release procedure is to complete.

Subsequently, the SM transmits a PDU session release notification message to the AMF (S912). The SMF_A 230 may transmit the PDU session release notification message, to thereby perform notification of completion of release of the PDU session, or perform notification of a state of maintaining storing partial information for relocation although the PDU session has been released. Note that the PDU session release notification message is not limited to this, and may be a message for performing notification of release of the PDU session.

Note that, based on reception of the PDU session release accept message, and/or based on reception of the PDU session release notification message and/or transmission of the PDU session release command message, the AMF may start count of the timer using the timer that manages storing of the information related to the PDU session. Based on reception of the PDU session release accept message, and/or based on reception of the PDU session release notification message and/or transmission of the PDU session release command message, the AMF may recognize and store information indicated by each message and/or the identification information included in each message.

In addition, in a case that count of the timer using the timer that manages storing of the information related to the PDU session expires, the AMF may release the information related to the PDU session and/or the context.

Based on reception of the PDU session release accept message, and/or based on transmission of the PDU session release notification message and/or reception of the PDU session release command message, the SMF may start count of the timer using the timer that manages storing of the information related to the PDU session.

In addition, in a case that count of the timer using the timer that manages storing of the information related to the PDU session expires, the SMF may release the information related to the PDU session and/or the context.

Based on transmission and/or reception in S906 and/or S908 and/or S912, each apparatus completes the present procedure. Note that, based on completion of the present procedure, each apparatus may transition to a state in which the PDU session is released. In addition, based on completion of the present procedure, each apparatus may perform processing based on the identification information transmitted and/or received in the present procedure.

For example, in a case that the UE receives one or more pieces of identification information out of the 11th identification information to the 12th identification information, the PDU session establishment procedure using the 11th identification information may be initiated immediately.

In addition, in a case that the UE receives one or more pieces of identification information out of the 11th identification information to the 12th identification information, the information related to the PDU session need not be temporarily released, or may be immediately released.

Based on the time limit (life time) of the S-NSSAI associated with the current PDU session nearing expiration, and based on the current PDU session being related to the SSC mode 2 or the SSC mode 4, the UE may transmit the PDU session release request message to the AMF. In addition, the AMF may transmit the received PDU session release request message to the SMF. Here, the UE_A 10 may include, in the PDU session release request message, identification information indicating a request for anchor relocation according to the S-NSSAI and/or the SSC associated with the current PDU session described above. Note that procedures after the SMF receives the PDU session release request message may be the procedure of S910 and the following procedures described with reference to FIG. 7.

3.3. PDU Session Establishment Procedure

Figure 8:
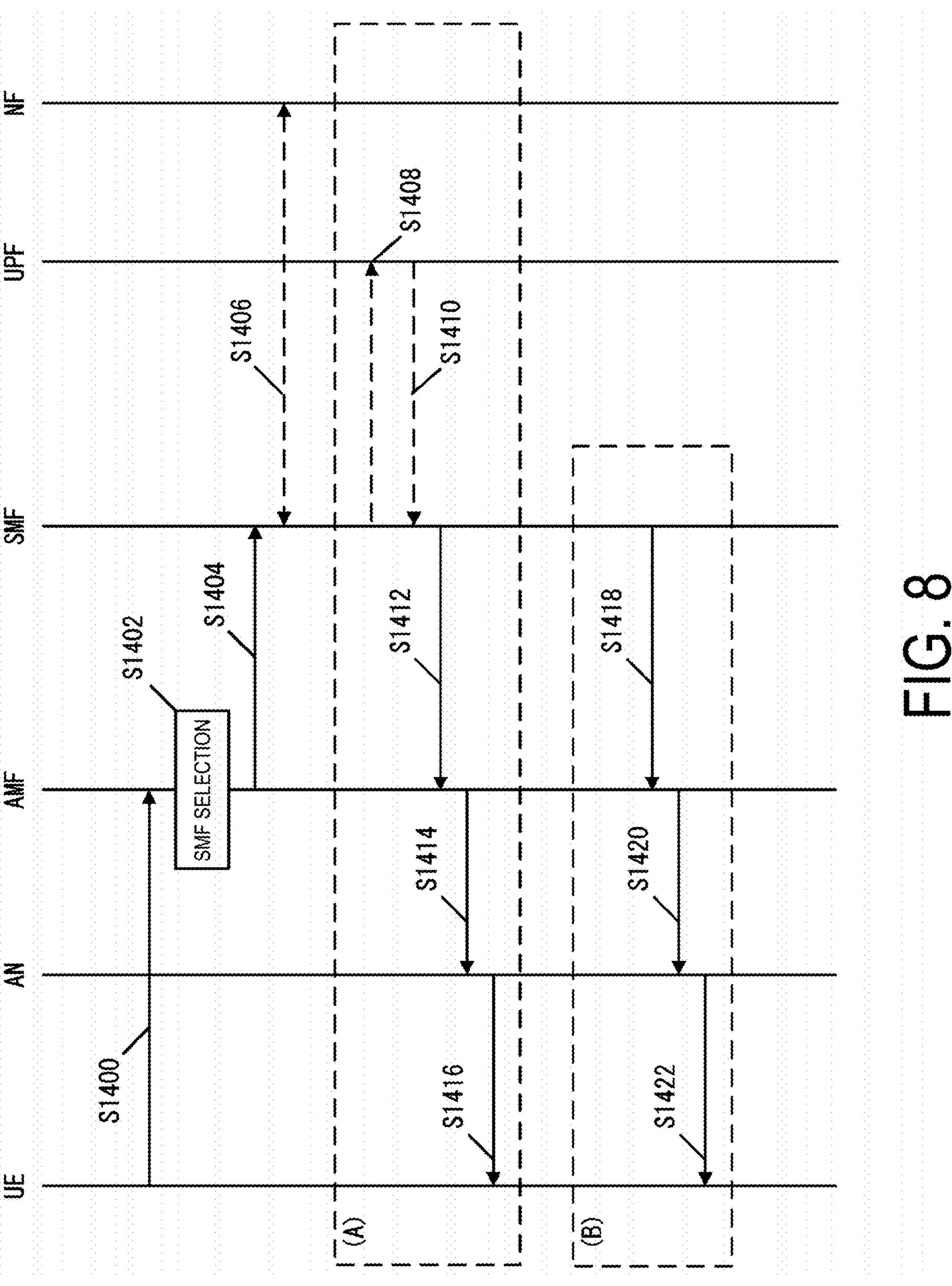
FIG. 8 is a diagram illustrating a PDU session establishment procedure.

Next, behaviors of each apparatus in a case that the UE performs the PDU session establishment procedure will be described with reference to FIG. 8. The PDU session establishment procedure may be hereinafter referred to as the present procedure. The PDU session establishment procedure may be an SM procedure.

Note that the present procedure may be performed after the registration procedure is performed one or more times.

First, the UE transmits a PDU session establishment request message to the SMF (S1400) (S1402) (S1404), and initiates the PDU session establishment procedure. Then, the SMF receives the PDU session establishment request message from the UE.

Specifically, the UE transmits a NAS message including an N1 SM container including the PDU session establishment request message to the AMF via the access network (S1400), to thereby initiate the PDU session establishment procedure. The NAS message may be, for example, a message transmitted via the N1 interface, and may be an uplink NAS transport (UL NAS TRANSPORT) message.

In addition, based on the NAS message received from the UE and/or the state of the network, the AMF may determine the SMF (S1402). In addition, the AMF may forward the identification information included in the received PDU session establishment request message and/or NAS message to the selected SMF (S1404).

Based on reception of at least one piece of identification information out of the first identification information to the second identification information and/or the 11th identification information to the 12th identification information, the UE may transmit the PDU session establishment request message.

Here, the UE may include at least one piece of identification information out of the 21st identification information to the 23rd identification information in the PDU session establishment request message or the NAS message for transmission. Note that the UE may include other identification information in the PDU session establishment request message or the NAS message. Specifically, the UE may include the requested DNN and the PDU session ID in the PDU session establishment request message or the NAS message.

Note that the UE may transmit these pieces of identification information, to thereby indicate that the UE supports each function, or indicate the request of the UE. In addition, in a case that multiple pieces of identification information are transmitted and/or received, two or more pieces of identification information of these pieces of identification information may be configured as one or multiple pieces of identification information. Note that information indicating support for each function and information indicating a request to use each function may be transmitted and/or received with the same piece of identification information or may be transmitted and/or received as different pieces of identification information.

Here, the UE may transmit the PDU session establishment request message or the NAS message, to thereby indicate details of the identification information to the network.

Based on reception of at least one piece of identification information out of the first identification information to the second identification information and/or the 11th identification information to the 12th identification information, the UE may transmit null 21st identification information, or may determine not to transmit the 21st identification information. In other words, based on reception of at least one piece of identification information out of the first identification information to the second identification information and/or the 11th identification information to the 12th identification information, the UE may transmit the PDU session establishment request message using no S-NSSAI.

Next, in a case that the AMF receives the NAS message, the AMF can recognize the request of the UE, and/or details of the information and the like (a message, a container, information) included in the NAS message.

Next, the AMF selects the SMF as a forwarding destination of at least a part of the information and the like (a message, a container, information) included in the NAS message received from the UE (S1402). Note that the AMF may select the SMF as a forwarding destination, based on the information and the like (a message, a container, information) included in the NAS message, and/or subscriber information, and/or capability information of the network, and/or a UE policy, and/or an operator policy, and/or the state of the network, and/or registration information of the user, and/or context stored in the AMF, and/or the like.

Specifically, the AMF may select the SMF for establishing the PDU session for a DNN similar to the DNN associated with the first PDU session. Similarly, the AMF may select the SMF for establishing the PDU session for S-NSSAI similar to the S-NSSAI associated with the first PDU session.

Alternatively, the AMF may select the SMF for establishing the PDU session for the S-NSSAI configured with an SST similar to the SST of the S-NSSAI associated with the first PDU session. Alternatively, the AMF may select the SMF for establishing the PDU session for S-NSSAI different from the S-NSSAI associated with the first PDU session.

Next, the AMF transmits at least a part of the information and the like (a message, a container, information) included in the NAS message received from the UE to the selected SMF via the N11 interface, for example (S1404).

Next, in a case that the SMF receives the information and the like (a message, a container, information) transmitted from the AMF, the SMF can recognize the request of the UE, and/or details of the information and the like (a message, a container, information) received from the AMF.

Here, the SMF may perform second condition fulfillment determination. The second condition fulfillment determination may be performed for determining whether or not the network accepts the request of the UE. In a case that the SMF determines that the second condition fulfillment determination is true, the SMF may initiate the procedure of (A) of FIG. 8, and in a case that the SMF determines that the second condition fulfillment determination is false, the SMF may initiate the procedure of (B) of FIG. 8.

Note that the second condition fulfillment determination may be performed by an NF other than the SMF. The NF may be, for example, an NSSF, an NWDAF, a PCF, or an NRF. In a case that the NF other than the SMF performs the second condition fulfillment determination, the SMF may provide the NF with at least a part of information necessary for performing the second condition fulfillment determination, specifically, information received from the UE (S1406). Then, in a case that the NF determines true or false of the second condition fulfillment determination based on the information received from the SMF, the NF may notify the SMF of information including results (in other words, true or false) of the second condition fulfillment determination. The SMF may determine the identification information and/or the control message to be transmitted to the UE, based on the results of the second condition fulfillment determination received from the NF.

Note that the second condition fulfillment determination may be performed based on the information and the like (a message, a container, information) received from the AMF, and/or the subscriber information (subscription information), and/or the capability information of the network, and/or the UE policy, and/or the operator policy, and/or the state of the network, and/or the registration information of the user, and/or the context stored by the SMF, and/or the like.

For example, in a case that the network allows the request of the UE, the second condition fulfillment determination may be determined as true, whereas in a case that the network does not allow the request of the UE, the second condition fulfillment determination may be determined as false. In a case that a network as a connection destination of the UE and/or an apparatus in the network supports the function requested by the UE, the second condition fulfillment determination may be determined as true, whereas in a case that the network and/or the apparatus does not support the function requested by the UE, the second condition fulfillment determination may be determined as false. In a case that the transmitted and/or received identification information is allowed, the second condition fulfillment determination may be determined as true, whereas in a case that the transmitted and/or received identification information is not allowed, the second condition fulfillment determination may be determined as false.

Note that the condition for determining true or false of the second condition fulfillment determination need not necessarily be limited to the condition described above.

Next, each step of the procedure of (A) of FIG. 8 will be described.

The SMF may select the UPF for a PDU session to be established, and transmit an N4 session establishment request message to the selected UPF via the N4 interface, for example (S1408). In the N4 session establishment request message, at least a part of a PCC rule received from the PCF may be included.

The SMF may determine whether or not to perform authorization of C2 communication during the present procedure, based on the information and the like (a message, a container, information) received from the AMF, and/or the information such as the PCC rule received from the PCF, and/or the subscriber information, and/or the capability information of the network, and/or the UE policy, and/or the operator policy, and/or the state of the network, and/or the registration information of the user, and/or the context stored by the SMF, and/or the like.

In a case that authorization of C2 communication is performed during the present procedure, based on at least one out of the 21st identification information to the 23rd identification information, the SMF may determine authorization of establishment of the PDU session requested by the UE.

Here, the SMF may select one or more UPFs, based on the information and the like (a message, a container, information) received from the AMF, and/or the information such as the PCC rule received from the PCF, and/or the subscriber information, and/or the capability information of the network, and/or the UE policy, and/or the operator policy, and/or the state of the network, and/or the registration information of the user, and/or the context stored by the SMF, and/or the like. In a case that multiple UPFs are selected, the SMF may transmit the N4 session establishment request message to each UPF. Here, it is assumed that the UPF is selected.

Next, in a case that the UPF receives the N4 session establishment request message (S1408), the UPF can recognize details of the information received from the SMF. The UPF may transmit an N4 session establishment response message to the SMF via the N4 interface, for example, based on reception of the N4 session establishment request message (S1410).

Next, in a case that the SMF receives the N4 session establishment response message as a response message for the N4 session establishment request message, the SMF can recognize details of the information received from the UPF.

Next, the SMF transmits a PDU session establishment accept message to the UE, based on reception of the PDU session establishment request message, and/or selection of the UPF, and/or reception of the N4 session establishment response message, and/or the like. Then, the UE receives the PDU session establishment accept message and/or the identification information from the SMF (S1418) (S1420) (S1422).

Specifically, the SMF transmits the N1 SM container, and/or N2 SM information, and/or the PDU session ID to the AMF via the N11 interface, for example, based on reception of the PDU session establishment request message, and/or selection of the UPF, and/or reception of the N4 session establishment response message, and/or the like (S1412). Here, the N1 SM container may include the PDU session establishment accept message. In addition, the PDU session ID may be included in the PDU session establishment accept message.

Next, the AMF that has received the N1 SM container, and/or the N2 SM information, and/or the PDU session ID transmits the NAS message to the UE via the first base station apparatus included in the access network (S1414) (S1416). Here, the NAS message is transmitted via the N1 interface, for example. The NAS message may be a downlink NAS transport (DL NAS TRANSPORT) message.

Specifically, in a case that the AMF transmits an N2 PDU session request message to the base station apparatus included in the access network (S1414), the base station apparatus that has received the N2 PDU session request message transmits the NAS message to the UE (S1416). Here, the N2 PDU session request message may include the NAS message and/or the N2 SM information. The NAS message may include the PDU session ID and/or the N1 SM container.

The PDU session establishment accept message may be a response message for the PDU session establishment request. The PDU session establishment accept message may indicate that establishment of the PDU session has been accepted.

Here, the SMF and/or the AMF may transmit the PDU session establishment accept message, and/or the N1 SM container, and/or the PDU session ID, and/or the NAS message, and/or the N2 SM information, and/or the N2 PDU session request message, to thereby indicate that at least a part of the request of the UE by the PDU session establishment request message has been accepted.

Here, the SMF and/or the AMF may include at least one piece of identification information out of the 31st identification information to the 32nd identification information in the PDU session establishment accept message, and/or the N1 SM container, and/or the NAS message, and/or the N2 SM information, and/or the N2 PDU session request message for transmission.

In a case that the NW supports change of the S-NSSAI according to anchor relocation, the SMF may transmit the 31st identification information to the UE. In a case that change of the S-NSSAI according to anchor relocation occurs, the SMF may transmit the 32nd identification information.

Note that, the SMF may transmit these pieces of identification information and/or the PDU session establishment accept message, to thereby indicate that the network supports each function, indicate that the request of the UE has been accepted, indicate that the request from the UE is not allowed, or indicate information of a combination of these. In addition, in a case that multiple pieces of identification information are transmitted and/or received, two or more pieces of identification information of these pieces of identification information may be configured as one or multiple pieces of identification information. Additionally/alternatively, in a case that multiple meanings are included in one piece of identification information, it may be transmitted and/or received by being divided into multiple pieces of identification information. For example, information indicating support of each function and information indicating a request for use of each function may be transmitted and/or received as the same piece of identification information, or may be transmitted and/or received as different pieces of identification information.

Specifically, the SMF may transmit the 31 st identification information, to thereby indicate that the NW has changed the S-NSSAI according to anchor relocation, transmit information indicating whether or not the NW supports a function enabling change of the S-NSSAI according to anchor relocation, or indicate that the NW supports a function enabling change of the S-NSSAI according to anchor relocation.

In a case that the NW and/or the established PDU session supports change of the S-NSSAI according to anchor relocation, the SMF may transmit the 31st identification information indicating that the NW and/or the established PDU session supports change of the S-NSSAI according to anchor relocation.

Based on reception of at least one piece of identification information out of the 21st identification information to the 23rd identification information, the SMF may transmit at least one piece of identification information out of the 31st identification information to the 32nd identification information.

Here, the network may transmit the PDU session establishment accept message, to thereby indicate details of the identification information to the UE.

Note that the network may also include identification information other than the 31st identification information to the 32nd identification information in the PDU session establishment accept message for transmission. Specifically, the network may include information indicating the SSC mode associated with the established PDU session and/or the anchor point in a Selected SSC mode IE for transmission. The network may include information indicating the SSC mode associated with the established PDU session and/or the anchor point in the Selected SSC mode IE for transmission.

Additionally/alternatively, the network may include the S-NSSAI and/or the DNN associated with the established PDU session in the PDU session establishment accept message for transmission.

Note that, in a case that the present procedure is the PDU session establishment procedure for the second PDU session in anchor relocation of the PDU session of the SSC modes 2 to 5, the S-NSSAI to be transmitted by the SMF may be the S-NSSAI associated with the second PDU session and may be different from the S-NSSAI associated with the first PDU session.

Additionally/alternatively, the SST included in the S-NSSAI to be transmitted by the SMF may be controlled as with the SST of the S-NSSAI associated with the first PDU session.

Note that the SMF and/or the AMF may determine which piece of identification information is to be included in the PDU session establishment accept message, and/or the N1 SM container, and/or the NAS message, and/or the N2 SM information, and/or the N2 PDU session request message, based on each piece of received identification information, and/or the subscriber information, and/or the capability information of the network, and/or the UE policy, and/or the operator policy, and/or the state of the network, and/or the registration information of the user, and/or the context stored by the SMF and/or the AMF, and/or the like.

Next, in a case that the UE receives the NAS message via the N1 interface, for example (S1416), the UE can recognize that the request of the UE by the PDU session establishment request message has been accepted, and/or details of the information and the like (a message, a container, information) included in the NAS message.

Next, each step of the procedure of (B) of FIG. 8 will be described.

First, based on reception of the PDU session establishment request message, the SMF transmits the N1 SM container and/or the PDU session ID to the AMF via the N11 interface, for example (S1418). Here, the N1 SM container may include a PDU session establishment reject message. In addition, the PDU session ID may be included in the PDU session establishment reject message.

Next, the AMF that has received the N1 SM container and/or the PDU session ID transmits the NAS message to the UE via the base station apparatus included in the access network (S1420) (S1422). Here, the NAS message is transmitted via the N1 interface, for example. The NAS message may be a downlink NAS transport (DL NAS TRANSPORT) message. The NAS message may include the PDU session ID and/or the N1 SM container.

The PDU session establishment reject message may be a response message for the PDU session establishment request. The PDU session establishment reject message may indicate that establishment of the PDU session has been rejected.

Here, the SMF and/or the AMF may transmit the PDU session establishment reject message, and/or the N1 SM container, and/or the PDU session ID, and/or the NAS message, to thereby indicate that the request of the UE on the PDU session establishment request message has been rejected.

Note that the SMF may transmit the PDU session establishment reject message, to thereby indicate that the request of the UE has been rejected, indicate that the request from the UE is not allowed, or indicate information of a combination of these.

Here, the SMF and/or the AMF may include the 35th identification information in the PDU session establishment reject message, and/or the N1 SM container, and/or the NAS message, and/or the N2 SM information, and/or the N2 PDU session request message for transmission.

Note that the SMF and/or the AMF may determine which piece of identification information is to be included in the PDU session establishment reject message, and/or the N1 SM container, and/or the NAS message, and/or the N2 SM information, and/or the N2 PDU session request message, based on each piece of received identification information, and/or the subscriber information, and/or the capability information of the network, and/or the UE policy, and/or the operator policy, and/or the state of the network, and/or the registration information of the user, and/or the context stored by the SMF and/or the AMF, and/or the like.

Next, in a case that the UE receives the NAS message via the N1 interface, for example (S1422), the UE can recognize that the request of the UE by the PDU session establishment request message has been rejected, and/or details of the information and the like (a message, a container, information) included in the NAS message.

In addition, in a case that the UE receives the 35th identification information, the UE may recognize details indicated by the received identification information. The UE may receive the NAS message, the PDU session establishment accept message, or the PDU session establishment reject message, to thereby recognize details of the identification information.

Specifically, based on reception of the 35th identification information, the UE may recognize that the NW does not support change of the S-NSSAI according to anchor relocation. Additionally/alternatively, based on reception of the 35th identification information, the UE may recognize that re-performing of the PDU session establishment request is requested from the NW. Based on reception of the 35th identification information, the UE may initiate the registration request procedure again, and in that case, the UE may request S-NSSAI similar to the S-NSSAI associated with the first PDU session from the NW.

Each apparatus may complete the present procedure, based on transmission and/or reception of the PDU session establishment accept message. In this case, each apparatus may transition to a state capable of communicating with the DN using the established PDU session.

Based on transmission and/or reception of the PDU session establishment accept message or the PDU session establishment reject message, each apparatus may complete the present procedure. In this case, each apparatus cannot establish a PDU session, and thus cannot communicate with the DN in a case that there is no PDU session that has been already established.

Note that each processing step illustrated above that the UE performs based on reception of each piece of identification information may be performed during the present procedure or after the present procedure is completed or may be performed based on completion of the present procedure after the present procedure is completed.

4. EMBODIMENTS OF PRESENT INVENTION

Embodiments in the present invention may be a combination of one or more procedures described in Section 3. For example, in the present embodiment, the UE in the registered state may perform the PDU session establishment procedure in Section 3.3 one or multiple times so that a PDU session is established. In addition, in a state in which at least one first PDU session is established between the UE and the NW, the PDU session release procedure in Section 3.1, and/or the PDU session release procedure in Section 3.2, and/or the PDU session establishment procedure in Section 3.3 may be performed one or multiple times.

Specific examples of the embodiments of the present invention will be described below.

4.1. First Embodiment

A first embodiment (hereinafter, the present embodiment) will be described below.

In the following, in the first embodiment, a procedure of performing change of the anchor point in the SSC mode 3 or the SSC mode 5 will be described. In other words, a procedure for performing session and service continuity with PDU session anchor change of the first PDU session associated with the SSC mode 3 and/or the SSC mode 5 being performed will be described. The first embodiment will be described with reference to FIG. 9.

Note that, here, the SSC mode 3 may mean the second SSC mode 3. In the following, unless specifically noted, the PDU session and/or the anchor point associated with the SSC mode 3 may also mean that support of change of the S-NSSAI according to anchor relocation is associated.

Figure 9:
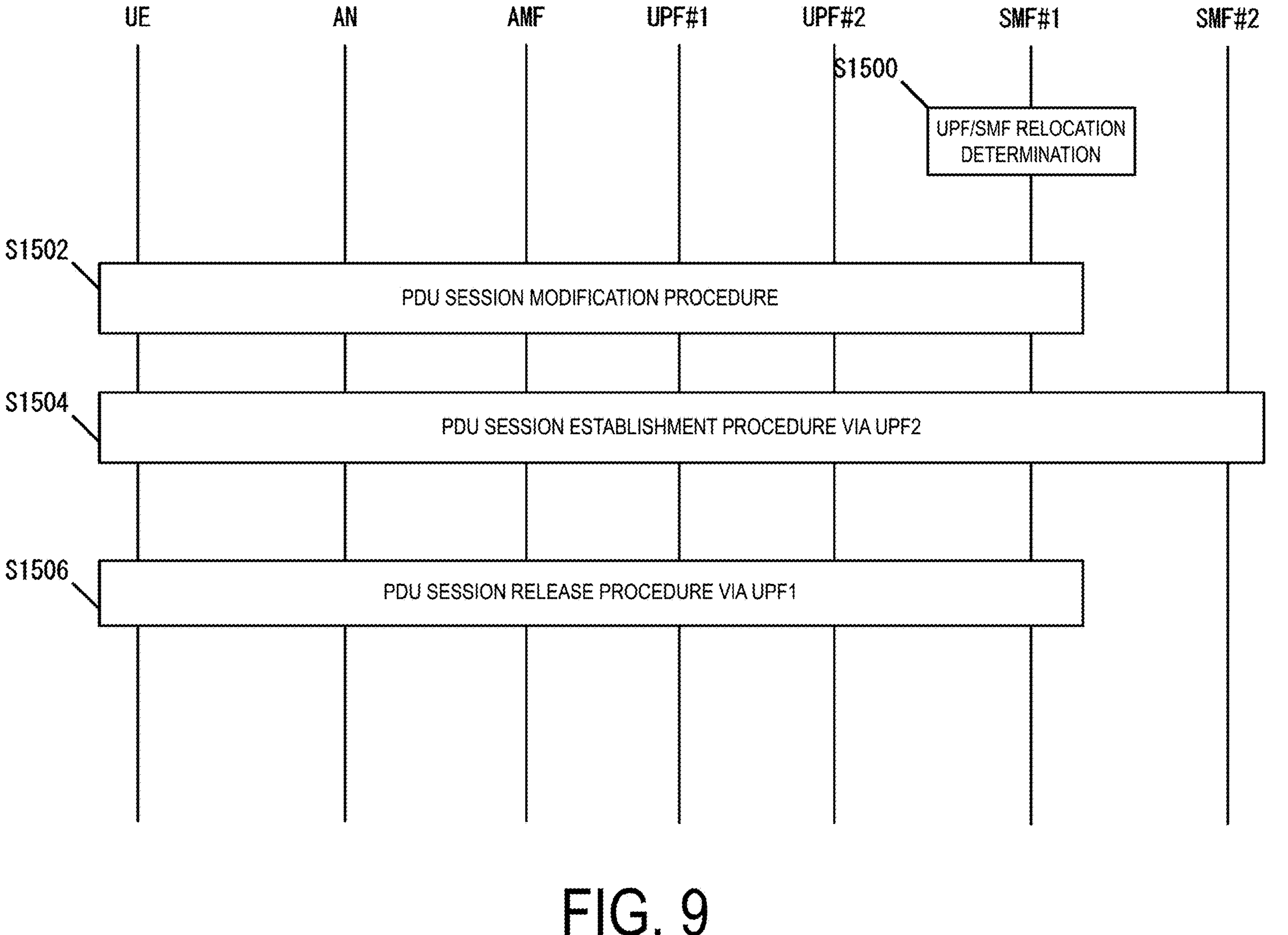
FIG. 9 is a diagram illustrating a first embodiment.

SMF #1 and SMF #2 of FIG. 9 may be the apparatuses in the same PLMN, or may be apparatuses in different PLMNs. SMF #1 and SMF #2 may be the SMF 132. Similarly, UPF #1 and UPF #2 of FIG. 9 may be apparatuses in the same PLMN, or may be apparatuses in different PLMNs. UPF #1 and UPF #2 may be the UPF 130.

First, as an initial state, the UE may be in a state in which the first PDU session via UPF #1 is established. Note that the first PDU session may be managed by SMF #1, and be associated with the SSC mode 3 and/or the SSC mode 5.

For each apparatus to transition to the initial state, each apparatus may perform the PDU session establishment procedure in Section 3.3, and establish the first PDU session, via UPF #1, which is associated with the SSC mode 3 and/or the SSC mode 5. The first PDU session may be associated with S-NSSAI #1 and/or DNN #1.

Next, SMF #1 determines relocation of the UPF and/or the SMF of the first PDU session (S1500). In other words, SMF #1 determines anchor relocation. For determination of anchor relocation of SMF #1, the trigger may be the same as that for the SMF to transmit the PDU session modification command message in the PDU session modification procedure in Section 3.1.

Specifically, for example, the SMF may determine relocation of the UPF and/or the SMF and/or the S-NSSAI, based on reception of the state change notification message transmitted from the AMF and/or the NSSF. For example, the AMF and/or the NSSF may transmit a message for performing notification of change of the S-NSSAI to SMF #1, based on the life time of S-NSSAI #1 nearing expiration.

Alternatively, for example, the AMF and/or the NSSF may transmit a message for performing notification of change of the S-NSSAI to SMF #1, based on S-NSSAI #1 and/or the NSI indicated by S-NSSAI #1 being overloaded in the core network.

Next, SMF #1 initiates the PDU session modification procedure, and performs the PDU session modification procedure for the first PDU session (S1502). Note that S1502 may be implemented through the procedures of S802 to S812 of FIG. 6.

Specifically, SMF #1 transmits the PDU session modification command message to the UE via the AMF. In the PDU session modification command, at least one or more pieces of identification information out of the first identification information to the second identification information may be included. The UE receives information and/or a message transmitted from the SMF and/or the AMF.

For example, SMF #1 may include S-NSSAI #2 in the 1st identification information for transmission. Additionally/alternatively, SMF #1 may indicate anchor relocation along with change of the S-NSSAI using the 2nd identification information.

Based on reception of one or more pieces of identification information out of the first identification information to the second identification information and/or the PDU session modification command message, the UE may recognize initiation of anchor relocation of the PDU session anchor associated with the SSC mode 3 and/or the SSC mode 5.

Specifically, based on reception of the 1st identification information and/or the 2nd identification information, the UE recognizes anchor relocation of the first PDU session. Here, the 1 st identification information may be S-NSSAI #2 different from S-NSSAI #1. Alternatively, the 1 st identification information may be null, and in that case, no S-NSSAI may be requested.

In a case of accepting the request from the NW, the UE transmits the PDU session modification accept message to SMF #1. SMF #1 may exchange the session modification request and/or the session modification response message with UPF #1.

Next, the PDU session establishment procedure via UPF #2 is initiated by the UE, and each apparatus performs the PDU session establishment procedure via UPF #2 (S1504). S1504 may be implemented through the procedures of S1400 to S1416 of FIG. 8.

Specifically, the UE transmits the PDU session establishment request message and/or at least one piece of identification information out of the 21st identification information to the 23rd identification information to SMF #2 via the AMF. The UE may include at least one piece of identification information out of the 21st identification information to the 23rd identification information in the PDU session establishment request message or the NAS message for transmission.

In a case that the UE receives the 1st identification information from the NW and the 1st identification information is not null, the UE may include the S-NSSAI included in the 1st identification information in the 21st identification information for transmission. In a case that the UE receives null 1st identification information from the NW, the UE need not transmit the 21st identification information to the NW.

In other words, in a case that the UE receives information indicating null S-NSSAI from the NW, the UE may transmit null 21st identification information, or need not transmit the 21st identification information.

SMF #2 selects UPF #2, based on the received information, and each apparatus establishes the second PDU session via UPF #2. The second PDU session may be associated with S-NSSAI #2 and/or DNN #1.

In addition, each apparatus releases the first PDU session via UPF #1 (S1506). The PDU session release procedure for releasing the first PDU session may be initiated from the UE, may be initiated from the SMF, or may be both. For example, S1506 may be the PDU session release procedure illustrated in FIG. 7. Note that, in that case, the cause value is different from 5GSM cause #39 "reactivation requested".

Through the above, each apparatus performs PDU session anchor change of the PDU session associated with the SSC mode 3 and/or the SSC mode 5, and implements session and/or service continuity. In other words, each apparatus changes the network slice, performs PDU session anchor change, and implements session and/or service continuity.

4.2. Second Embodiment

A second embodiment (hereinafter, the present embodiment) will be described below.

In the second embodiment, a procedure of performing change of the anchor point in the SSC mode 2 or the SSC mode 4 will be described.

In the following, in the second embodiment, a procedure of performing change of the anchor point in the SSC mode 2 or the SSC mode 4 will be described. In other words, a procedure for performing session and service continuity with PDU session anchor change of the first PDU session associated with the SSC mode 2 and/or the SSC mode 4 being performed will be described. The second embodiment will be described with reference to FIG. 10.

Note that, here, the SSC mode 2 may mean the second SSC mode. In the following, unless specifically noted, the PDU session and/or the anchor point associated with the SSC mode 2 may also mean that support of change of the S-NSSAI according to anchor relocation is associated.

Figure 10:
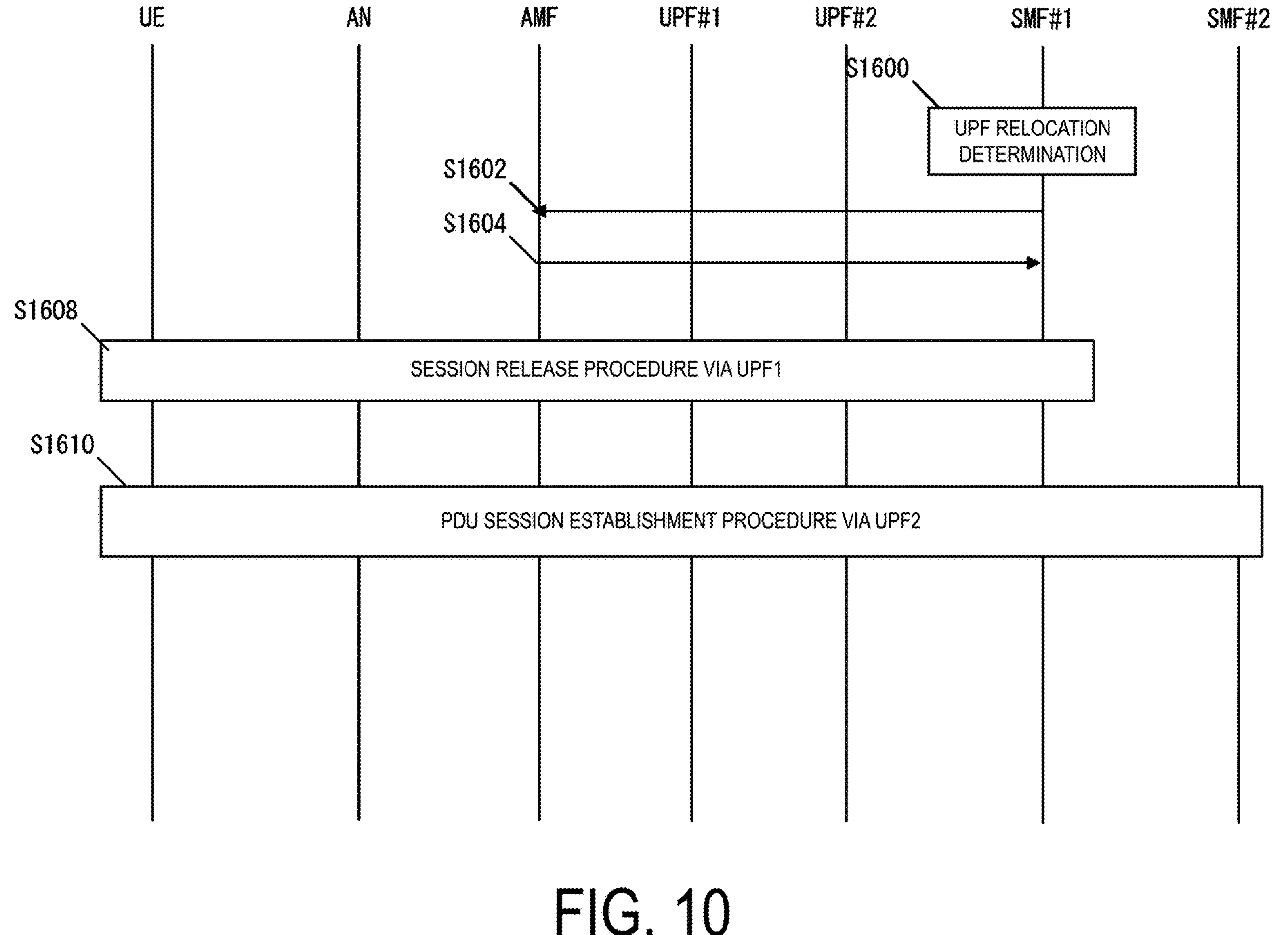
FIG. 10 is a diagram illustrating a second embodiment.

SMF #1 and SMF #2 of FIG. 10 may be the apparatuses in the same PLMN, or may be apparatuses in different PLMNs. SMF #1 and SMF #2 may be the SMF 132. Similarly, UPF #1 and UPF #2 of FIG. 10 may be apparatuses in the same PLMN, or may be apparatuses in different PLMNs. UPF #1 and UPF #2 may be the UPF 130.

First, as an initial state, the UE may be in a state in which the first PDU session via UPF #1 is established. Note that the first PDU session may be managed by SMF #1, and be associated with the SSC mode 2 and/or the SSC mode 4.

For each apparatus to transition to the initial state, each apparatus may perform the PDU session establishment procedure in Section 3.3, and establish the first PDU session, via UPF #1, which is associated with the SSC mode 2 and/or the SSC mode 4. The first PDU session may be associated with S-NSSAI #1 and/or DNN #1.

Next, SMF #1 determines relocation of the UPF and/or the SMF of the first PDU session (S1600). In other words, SMF #1 determines anchor relocation. For determination of anchor relocation of SMF #1, the trigger may be the same as that for the SMF to transmit the PDU session release command message and/or the release request message in the PDU session modification procedure in Section 3.2.

Specifically, for example, the SMF may determine relocation of the UPF and/or the S-NSSAI, based on reception of the state change notification message transmitted from the AMF and/or the NSSF. For example, the AMF and/or the NSSF may transmit a message for performing notification of change of the S-NSSAI to SMF #1, based on the life time of S-NSSAI #1 nearing expiration.

Alternatively, for example, the AMF and/or the NSSF may transmit a message for performing notification of change of the S-NSSAI to SMF #1, based on S-NSSAI #1 and/or the NSI indicated by S-NSSAI #1 being overloaded in the core network.

Next, SMF #1 transmits DNAI information being information for selecting the SMF (SMF #2) for establishing the second PDU session to the AMF (S1602), and the AMF that has received the DNAI (DNAI information) information transmits a response message to SMF #1 (S1604). Here, as the DNAI information, information indicating DNN #1 and/or S-NSSAI #2 may be configured.

Next, SMF #1 performs the PDU session release procedure for releasing the first PDU session via UPF #1 (S1608). Note that S1608 may be implemented through the procedures of S902 to S912 of FIG. 7.

Specifically, SMF #1 transmits the PDU session release command message to the UE via the AMF.

Here, the SMF and/or the AMF may include, in the PDU session release command message and/or the NAS message, at least one or more pieces of identification information out of the 11th identification information to the 12th identification information, and may include these pieces of identification information, to thereby indicate the request for release of the PDU session.

For example, SMF #1 may include S-NSSAI #2 in the 11th identification information for transmission. Additionally/alternatively, SMF #1 may indicate anchor relocation along with change of the S-NSSAI using one or more pieces of identification information out of the 12th identification information to the 12th identification information.

The UE receives one or more pieces of identification information out of the 11th identification information to the 12th identification information and/or the PDU session release command message. Based on reception of one or more pieces of identification information out of the 11th identification information to the 12th identification information and/or the PDU session release command message, the UE may recognize initiation of anchor relocation of the PDU session anchor associated with the SSC mode 2 and/or the SSC mode 4.

Specifically, based on reception of one or more pieces of identification information out of the 11th identification information to the 12th identification information, the UE recognizes anchor relocation of the first PDU session. Here, the 11th identification information may be S-NSSAI #2 different from S-NSSAI #1. Alternatively, the 11th identification information may be null, and in that case, no S-NSSAI may be requested.

In a case of accepting the request from the NW, the UE transmits the PDU session release accept message to SMF #1. SMF #1 may exchange the session modification request and/or the session modification response message with UPF #1. Through the above, each apparatus releases the first PDU session.

Next, the PDU session establishment procedure via UPF #2 is initiated by the UE, and each apparatus performs the PDU session establishment procedure via UPF #2 (S1610). S1610 may be implemented through the procedures of S1400 to S1416 of FIG. 8.

Specifically, the UE transmits the PDU session establishment request message and/or at least one piece of identification information out of the 21st identification information to the 23rd identification information to SMF #2 via the AMF. The UE may include at least one piece of identification information out of the 21st identification information to the 23rd identification information in the PDU session establishment request message or the NAS message for transmission.

In a case that the UE receives the 11th identification information from the NW and the 11th identification information is not null, the UE may include the S-NSSAI included in the 11th identification information in the 21st identification information for transmission. In a case that the UE receives null 1st identification information from the NW, the UE need not transmit the 21st identification information to the NW.

In other words, in a case that the UE receives information indicating null S-NSSAI from the NW, the UE may transmit null 21st identification information, or need not transmit the 21st identification information.

SMF #2 selects UPF #2, based on the received information, and each apparatus establishes the second PDU session via UPF #2. The second PDU session may be associated with S-NSSAI #2 and/or DNN #1.

Through the above, each apparatus performs PDU session anchor change of the PDU session associated with the SSC mode 2 and/or the SSC mode 4, and implements session and/or service continuity. In other words, each apparatus changes the network slice, performs PDU session anchor change, and implements session and/or service continuity.

5. MODIFICATIONS

A program running on an apparatus according to the present invention may serve as a program that controls a Central Processing Unit (CPU) and the like to cause a computer to function to realize the functions of the aforementioned embodiments according to the present invention. Programs or information handled by the programs are temporarily stored in a volatile memory such as a Random Access Memory (RAM), a non-volatile memory such as a flash memory, a Hard Disk Drive (HDD), or another storage apparatus system.

Note that a program for realizing the functions of the embodiments according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. In addition, the "computer-readable recording medium" may be a semiconductor recording medium, an optical recording medium, a magnetic recording medium, a medium dynamically retaining the program for a short time, or any other computer-readable recording medium.

In addition, each functional block or various features of the apparatuses used in the aforementioned embodiments may be implemented or performed on an electric circuit, for example, an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In addition, in a case that a circuit integration technology that replaces the present integrated circuits appears with advances in semiconductor technologies, one or multiple aspects of the present invention can also use a new integrated circuit based on the technology.

Note that the invention of the present application is not limited to the above-described embodiments. Although apparatuses have been described as an example in the embodiments, the invention of the present application is not limited to these apparatuses, and is applicable to a terminal apparatus or a communication apparatus of a fixed-type or a non-stationary electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that do not depart from the gist of the present invention. Furthermore, in the present invention, various modifications are possible within the scope of claims, and embodiments that are made by suitably combining technical means disclosed according to the different embodiments are also included in the technical scope of the present invention. In addition, a configuration in which elements described in the respective embodiments and having mutually the similar effects are substituted for one another is also included.

CROSS-REFERENCE TO RELATED APPLICATION

The present application claims priority of JP 2022-052713, filed on Mar. 29, 2022, and all the contents thereof are included herein by the reference.

REFERENCE SIGNS LIST

1 Mobile communication system
10 UE_A

30 PGW-U
32 PGW-C
35 SGW
40 MME
45 eNB
50 HSS
60 PCRF
80 Access network_A (E-UTRAN)
90 Core network_A
120 Access network_B (5G AN)
122 gNB
130 UPF
132 SMF
140 AMF
150 UDM
160 PCF
190 Core network_B

The invention claimed is:

1. A User Equipment (UE) comprising:
transmission and reception circuitry; and
controlling circuitry,
wherein
the transmission and reception circuitry is configured to receive, from a network, a Protocol Data Unit (PDU) session release command message including a second Single Network Slice Selection Assistance Information (S-NSSAI),
the controlling circuitry is configured to release a first PDU session,
the first PDU session is a PDU session of a Session and Service Continuity (SSC) mode 2,
an S-NSSAI of the first PDU session is a first S-NSSAI different from the second S-NSSAI,
the transmission and reception circuitry is configured to transmit, to the network, the second S-NSSAI and a PDU session establishment request message, and
the controlling circuitry is configured to establish a second PDU session.

2. The UE according to claim 1, wherein the PDU session release command message further includes a cause value indicating reactivation requested.

3. A communication control method performed by a User Equipment (UE), the communication control method comprising:
receiving, from a network, a Protocol Data Unit (PDU) session release command message including a second Single Network Slice Selection Assistance Information (S-NSSAI);
releasing a first PDU session;
wherein
the first PDU session is a PDU session of a Session and Service Continuity (SSC) mode 2, and
an S-NSSAI of the first PDU session is a first S-NSSAI different from the second S-NSSAI,
transmitting, to the network, the second S-NSSAI and a PDU session establishment request message; and
establishing a second PDU session.

* * * * *